United States Patent
Schradin et al.

(10) Patent No.: US 12,482,200 B2
(45) Date of Patent: Nov. 25, 2025

(54) VIRTUAL REALITY TRAINING DEVICE

(71) Applicants: Aaron Schradin, West Olive, MI (US); Christopher A. Eusebi, Bloomfield Township, MI (US)

(72) Inventors: Aaron Schradin, West Olive, MI (US); Christopher A. Eusebi, Bloomfield Township, MI (US)

( * ) Notice: Subject to any disclaimer, the term of this patent is extended or adjusted under 35 U.S.C. 154(b) by 0 days.

(21) Appl. No.: 18/544,253

(22) Filed: Dec. 18, 2023

(65) Prior Publication Data
US 2024/0346777 A1 Oct. 17, 2024

Related U.S. Application Data

(63) Continuation of application No. 16/571,835, filed as application No. PCT/US2018/022481 on Mar. 14, (Continued)

(51) Int. Cl.
| | |
|---|---|
| *G06T 19/00* | (2011.01) |
| *A47C 1/00* | (2006.01) |
| *A47C 7/72* | (2006.01) |
| *A47C 15/00* | (2006.01) |
| *G06F 3/01* | (2006.01) |

(Continued)

(52) U.S. Cl.
CPC ............ *G06T 19/006* (2013.01); *A47C 1/00* (2013.01); *A47C 7/72* (2013.01); *A47C 15/004* (2013.01); *G06F 3/011* (2013.01); *G06T 17/05* (2013.01); *G09B 9/003* (2013.01); *A47C 3/18* (2013.01); *A47C 3/20* (2013.01); *A63F 13/211* (2014.09); *A63F 13/24* (2014.09); *A63F 13/285* (2014.09); *A63F 2300/1043* (2013.01);
(Continued)

(58) Field of Classification Search
None
See application file for complete search history.

(56) References Cited

U.S. PATENT DOCUMENTS

| | | | |
|---|---|---|---|
| 5,923,561 A | 7/1999 | Higasayama et al. | |
| 6,114,990 A * | 9/2000 | Bergljung | G09B 9/24 701/470 |

(Continued)

FOREIGN PATENT DOCUMENTS

| | | |
|---|---|---|
| DE | 102015013300 A1 | 4/2016 |
| EP | 1832202 A1 | 12/2007 |
| WO | 2015/195155 A1 | 12/2015 |

OTHER PUBLICATIONS

Macharet, Douglas G., Armando A. Neto, and Mario FM Campos. "On the generation of feasible paths for aerial robots in environments with obstacles." 2009 IEEE/RSJ International Conference on Intelligent Robots and Systems. IEEE, 2009.*

(Continued)

*Primary Examiner* — Sultana M Zalalee
(74) *Attorney, Agent, or Firm* — Ingrassia Fisher & Lorenz

(57) ABSTRACT

According to the present teachings a system is provided having a landscape engine configured to take digital input and convert it into three dimensional at virtual reality dataset. The landscape engine is functionally coupled to a physics engine configured to physical rules to objects within the virtual reality dataset. A display engine is coupled to the physics engine to convert the dataset into first and second content streams.

16 Claims, 10 Drawing Sheets

Related U.S. Application Data 2018, now abandoned, which is a continuation-in-part of application No. PCT/US2018/014056, filed on Jan. 17, 2018.

(60) Provisional application No. 62/524,317, filed on Jun. 23, 2017, provisional application No. 62/471,333, filed on Mar. 14, 2017, provisional application No. 62/447,329, filed on Jan. 17, 2017.

(51) Int. Cl.
| | |
|---|---|
| *G06T 17/05* | (2011.01) |
| *G09B 9/00* | (2006.01) |
| *A47C 3/18* | (2006.01) |
| *A47C 3/20* | (2006.01) |
| *A63F 13/211* | (2014.01) |
| *A63F 13/24* | (2014.01) |
| *A63F 13/285* | (2014.01) |

(52) U.S. Cl.
CPC ... *A63F 2300/105* (2013.01); *A63F 2300/302* (2013.01); *A63F 2300/8082* (2013.01); *G06T 2219/024* (2013.01)

(56) References Cited

U.S. PATENT DOCUMENTS

| | | | |
|---|---|---|---|
| 8,864,497 B1* | 10/2014 | Pollak | G09B 9/08 434/37 |
| 9,610,862 B2 | 4/2017 | Bonk et al. | |
| 10,051,113 B1 | 8/2018 | Knas et al. | |
| 2003/0210832 A1 | 11/2003 | Benton | |
| 2004/0056520 A1 | 3/2004 | Cho | |
| 2010/0017047 A1 | 1/2010 | Sanders-Reed | |
| 2010/0073363 A1* | 3/2010 | Densham | G05B 17/02 718/1 |
| 2012/0203487 A1 | 8/2012 | Johnson et al. | |
| 2013/0083011 A1 | 4/2013 | Geisner et al. | |
| 2013/0222369 A1 | 8/2013 | Huston et al. | |
| 2014/0062865 A1 | 3/2014 | Fateh | |
| 2014/0100774 A1* | 4/2014 | Showering | G01C 21/165 701/469 |
| 2014/0135991 A1 | 5/2014 | Summer et al. | |
| 2014/0240313 A1 | 8/2014 | Varga | |
| 2015/0020865 A1 | 1/2015 | Xiao | |
| 2015/0235434 A1 | 8/2015 | Miller et al. | |
| 2016/0019720 A1* | 1/2016 | Thurber | G02B 27/0172 345/419 |
| 2016/0035224 A1 | 2/2016 | Yang et al. | |
| 2016/0132052 A1 | 5/2016 | Seydoux et al. | |
| 2016/0133230 A1 | 5/2016 | Daniels et al. | |
| 2016/0253843 A1 | 9/2016 | Lee | |
| 2016/0306351 A1 | 10/2016 | Fisher et al. | |
| 2016/0320862 A1 | 11/2016 | Schradin et al. | |
| 2016/0332028 A1 | 11/2016 | Melnik | |
| 2017/0148219 A1 | 5/2017 | Takahashi | |
| 2017/0148340 A1* | 5/2017 | Popa-Simil | G09B 9/48 |
| 2017/0168501 A1 | 6/2017 | Ogura et al. | |
| 2017/0174344 A1 | 6/2017 | Lema et al. | |
| 2017/0185081 A1 | 6/2017 | Steele et al. | |
| 2017/0236320 A1 | 8/2017 | Gribetz et al. | |
| 2017/0277176 A1 | 9/2017 | Hutson | |
| 2017/0308087 A1 | 10/2017 | Tian et al. | |
| 2018/0109767 A1 | 4/2018 | Li et al. | |
| 2020/0035030 A1 | 1/2020 | Schradin et al. | |

OTHER PUBLICATIONS

El-Ganainy et al. Streaming Virtual Reality Content. Dec. 2016 [retrieved on Mar. 13, 2018]. Retrieved from the Internet :<URL:http://arxiv.org/pdf/1612.08350.pdf>.

* cited by examiner

VIRTUAL REALITY TRAINING DEVICE

CROSS-REFERENCE TO RELATED APPLICATIONS

This application claim the benefit of PCT/US18/22481 AND U.S. application Ser. No. 16/571,835 filed on Sep. 16, 2019, AND U.S. application Ser. No. 16/478,778, which claim the benefit of PCT/US18/14056, filed on Jan. 17, 2018, U.S. Provisional Application No. 62/447,329, filed on Jan. 17, 2017 and U.S. Provisional Application No. 62/524,317, filed on Jun. 23, 2017. The entire disclosure of the above applications are incorporated herein by reference.

FIELD OF THE INVENTION

The present invention relates to an augmented and virtual reality training system and more particularly to input and systems data structures intended to increase the performance of the augmented and virtual reality training system.

BACKGROUND OF THE INVENTION

For humans to interact and operate computers, external input devices are generally required. Signals from these external input devices are received by the computer and processed to act as a control signal for controlling an aspect of the computer's function and/or applications (programs) running on the computer.

Traditionally, input devices such as keyboards, mice, game controllers and the like have focused on receiving input movements from the hands and particularly the fingers of users. While these have proven effective, they are poorly suited for more immersive, intuitive control schemes. The development of immersive computer-generated environments such as those used for gaming, social interaction, computer-aided design and other similar functions have highlighted the need for new input devices. Of note is the rise of augmented reality ("AR") and virtual reality ("VR") technology that enables users to be fully immersed in computer generated environments. AR and VR technology platforms are poorly suited for traditional input methods as they can break immersion and detract from the user's experience.

Often input device associated with VR have functions that are inherently unstable. Generally, the further a user moves from a center location, the easier it is to continue moving further because the user's center of gravity goes outside the bounds of the device. To counteract this, devices can be modified with the addition of ballast. This however still never truly corrects the problem as it often increases the resistance force. For example, the further the pivot point for movement is from a user's hips, the further the users must move a user's body to create the angle the MPU needs and still have a decent sensitivity and proper "dead-zone." Also, somewhat susceptible to "signal drift."

Further, the users must move to create the movement, the longer it takes to adjust a user's movement or change movement directions, which makes the user's overshoot a user's preferred movement position. Depending slightly on the radius of the bottom, to go full-speed forward to full-speed backwards means the users must move a user's body around 22 inches.

The further the user's movement can put a user off-balance in VR, the more a user's body contemplates going on strike via way of VR induced motion sickness.

Fundamental VR Problems:
Does not address cable management/tangle
Does not address uncoupled look/move
Leaves room for improvement for a more compact operation envelope
Rubs and walks on flooring due to off axis rotation and no turntable Another problem associated with VR systems is sickness caused by the vestibular system which provides the leading contribution to the sense of balance and spatial orientation for the purpose of coordinating movement with balance. As movements consist of rotations and translations, the vestibular system comprises two components: a first which indicates rotational movements; and a second, which indicates linear accelerations. The vestibular system sends signals primarily to the neural structures that control eye movements, and to the muscles that keep an individual upright. Discoordination of these signals leads to motion sickness when using VR and AR systems.

These approaches were a bit more complex, but much more satisfying. Though the experience was less interesting for a crowd of VR curious onlookers to observe, it was eroding away at the real problems that faced VR. Traditionally, VR systems couple head movement to torso movement. For example, a user in a VR environment can for example travel down a sidewalk and wherever the user's looked, the user travels in the vision direction.

SUMMARY OF THE INVENTION

As specified in the Background Section above, there is a need for improved devices and methods for providing user input for controlling and or interacting with a computing device.

To overcome the afore mentioned problems, the system according to the present system measures the angle of the user's torso and feeds it back to the application so that the player axis is defined by torso angle. The head mounted display is then constrained to that player but "uncoupled" so that the view from the head mounted display is not affected by the torso angle, but only by the angle interpreted by the head mounted display. The torso angle information is presented as a part of the Human Interface device packet.

According to an alternate teaching, the system can include a rotary slip connector, and a quadrature rotary encoder that keeps track of the orientation of a user's body. Each degree moved is added or subtracted from the original calibration position and can be as accurate as one degree. Optionally, when a user of a system initiates movement, the natural response of the user is to "lean" in the direction they wish to head.

The design of system allows for super-fast directional changes, because a properly trained user of a system does not have to translate their center of gravity to move any direction, they simply use core muscle movement to redistribute their weight to create the movement in VR. Optionally, the system utilizes a solution which the seating surface tilts at a point closer to the hips or seat of the user This pivot location is critical as this approach never puts the user in a position of instability of falling.

According to the present teachings, the system allows a user's lower body function to allow movement in a VR space. The system can incorporate mechanical binary or linear input switches and an analog representation through a multiple axis processing unit (MPU).

According to the present teachings, the system can provide to those users which are less sensitive to the sensations of VR movement, users can optionally just use a raw analog input gradient to create user movements and use the switches for jump or some other function.

According to the present teachings, the system includes a rotary slip connector design, configured to reliably pass the following signals through the system to ensure that cables, and their signals, are heard loud and clear and never bind, tangle, or twist: HDMI; USB; Power; and 3 Line Developer. The rotary slip connector design "Infinite" rotation with no tangle. According to the present teachings, the system includes a small stool or chair.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

According to the present teachings, the AR/VR training and mapping system allows users or soldiers to gain situational comfort for by training in a virtual training environment, and optionally followed by an augmented training environment. This increases the speed at which the users absorb memories about a terrain. Information from the VR and AR environments can be used in a mixed reality (MR) situation or real mission the information provides a more memorable experience for retention of the knowledge of the terrain. According to the present teachings a system is provided having a landscape engine configured to take digital input and convert it into three dimensional at virtual reality dataset. The landscape engine is functionally coupled to a physics engine (such as by way of non-limiting example the unreal engine) configured to physical rules to objects within the virtual reality dataset. A display engine is coupled to the physics engine to convert the dataset into first and second content streams. According to the present teachings the system includes a first VR headset configured to receive the first content and a first AR headset configured to present a second dataset onto an AR display.

According to the present teachings the system includes training scenarios wherein the first dataset comprises a rendered topographic landscape.

According to the present teachings the system includes a second dataset having an augmented reality content that is less than the content of the first dataset.

According to another teaching, a method for training a solder is presented. The method includes capturing a series of images for a terrain using a drone. The image data series of the terrain is converted into a captured set of images and into a wire frame of the topographic landscape. The system syncs the wire frame of the topographic landscape to a real world located using a fixed coordinate system such as gps. The system then optionally provides a set of polygons over the wire frame to form a virtual reality image dataset.

The system applies a physics engine to object within the VR image dataset. The VR data set is coupled to a display engine which provides a first VR image dataset stream to a VR display. The display engine also provides a second AR image dataset less than the first VR image dataset which is streamed to an AR display. The training system according to the aforementioned system where the first VR image dataset includes a selecting engageable virtual sandbox which gives an overhead view of the entire topography, and in VR data space topography.

The training system according to the aforementioned system wherein the second AR image dataset is polygons for texture and content selectively disposed onto a real world optically viewable surface through an AR display and fourth set of data which overlays a wire frame image over real word surfacing in an augmented reality goggles.

According to a new teaching, the landscape engine can selectively accept data from GIS, 3-D heat map data from an FLIR image, data from a Lidar imaging system, and combinations thereof and augment portions of the VR landscape by applying layers of the new information.

According to a new teaching, the aforementioned system can include a dataset having image data for items such as a vehicles, or red team personnel that are placeable by the first person onto the sandbox, these items also being simultaneously positioned within the VR space, where they are affected by rules defined by the physics engine.

The system according to the aforementioned systems further having a difference engine which compares a first image with a second image. The difference engine highlighting changes between the first and second images within at least one of the sand box, VR and MR datasets.

According to another teaching, the difference engine calculates changes in elevation of ground of greater than 5 mm, placement of vehicles, changes in thermal energy emitted from a portion of the image.

According to another teaching, a physics engine can selectively apply vary light conditions to the display data.

According to another teaching, the physics engine can selectively apply varying weather conditions to the display data.

According to another teaching, the aforementioned systems can further include a distance calculator which can calculate distance between two locations in one of the virtual dataset and the AR world.

According to another teaching, the system can further include an injury probability system which calculates a probably of injury for a given path in VR, AR, MR space and highlights least probability of injury paths in VR, AR, MR space and changes the probabilities based on changes in the VR, AR, MR space model.

According to another teaching, the aforementioned systems can utilize intelligent CNC cutter-path mathematics to define the path of a data collection drone to most efficiently calculate needed information for a variety of layers in a variety of spectrum. This will allow, the maintenance a constant data buffering rates to minimize data feed rate losses and to maximize program processing speed.

"Smart imaging" is a feature that aims to produce an intelligent, optimized drone path. Its functionality can include options for examining data between Z layers-including data feed connections, slope control flight, and geometry identification. To achieve near net shape when imaging, it is important for the control software to understand what changes in surface topology occur between the layers of down-steps. Knowledge of terrain remaining algorithms must look ahead to determine where extra closer imaging-steps are necessary. Smart imaging is how a flight control system images this "between layers" material. By rough imaging in this manner, often the semifinish pass may be eliminated, saving on drone flight time and computation resources. Smart imaging may also include helical ramping functionality. This is used for pocket imagine. The helical ramping function determines helical movement based on entry angle and geometry. This function is most important when the imager reaches an obscured area of terrain. It can make the drone path shorter and safer by eliminating unneeded duplication, as a result of tailoring the tool path to the geometry of the obscured features.

According to the present teachings, the system can map available electromagnetic spectrum including EM radio signal dead zones and the location of transmitters within the VR, AR, MR dataset.

According to the present teachings, a method and system for sharing a three-dimensional virtual reality space among a plurality of users is provided. The method includes the step of, acquiring three-dimensional graphics data associated with a geographic region to be used by the plurality of users in a shared manner using a mobile platform such as an autonomous vehicle first and second times. Noting when objects or surfaces within the geographic region whose state is changed between the first and second time is changed during a predetermined time period. The method includes the step of functionally coupling the three-dimensional graphics data to a physics engine configured to physical rules to objects within the virtual reality dataset. Additionally, the method includes functionally coupling a display engine coupled to the physics engine to convert the dataset into first and second content streams. The method includes streaming a first content set from the three-dimensional graphics data to a VR headset and a second content set three-dimensional graphics data to an AR headset.

The method and system according to a previous or following paragraphs wherein streaming a first content set includes streaming training scenarios and wherein the first dataset comprises a rendered topographic landscape.

The method or system according to a previous or following paragraphs wherein the second dataset has an augmented reality content that is less than the content of the first dataset.

The method or system according to a previous or following paragraphs including capturing a series of images for a terrain using a drone and converting into a captured set of images and into a wire frame of the topographic landscape.

The method or system according to a previous or following paragraphs including the topographic landscape to a real world located using a fixed coordinate system.

The method or system according to a previous or following paragraphs including providing a set of polygons over the wire frame to form a virtual reality image dataset.

The method or system according to a previous or following paragraphs including providing a second AR image dataset having less content than the first VR image dataset which is streamed to an AR display.

The method or system according to a previous or following paragraphs wherein providing a first VR image dataset includes a selecting engageable virtual sandbox which gives an overhead view of the entire topography, and in VR data space topography.

According to another embodiment, a method or system for training a soldier is provided. The method or system includes the steps of capturing a series of images for a terrain using a drone or flying mobile platform. The method or system includes the steps of converting the image data series of the terrain into a captured set of images and into a wire frame of the topographic landscape. The method or system includes syncing the wire frame of the topographic landscape to a real world located using a fixed 5 coordinate system. The method or system includes applying a physics engine to object within the VR image dataset. The method or system includes streaming a first image dataset stream to a VR display, and a second AR image dataset less than the first VR image dataset which is streamed to an AR display.

The method or system according to a previous or following paragraphs includes sharing a three-dimensional virtual reality space among a plurality of users. The method or system can include acquiring a plurality of images of a geographic region using a mobile platform.

The method according to one or more of the previous or following paragraphs includes using photogrammetry to create a first set of three-dimensional graphics data associated with a geographic region to be used by the plurality of users in a shared manner. The three-dimensional graphics data is functionally coupled to a physics engine configured to physical rules to objects within the virtual reality dataset. A display engine is coupled to the physics engine to convert the dataset into first and second content streams. One of the first content streams and second content streams from the three-dimensional graphics data is selectively streaming either to a VR headset.

The method or system according to one or more of the previous or following paragraphs wherein streaming a first content stream includes streaming the first dataset which comprises a rendered topographic landscape.

The method or system according to one or more of the previous or following paragraphs wherein streaming a second content stream includes streaming the second dataset has an augmented reality content that is less than the content of the first dataset.

The method or system according to one or more of the previous or following paragraphs includes capturing a series of images for a terrain using a drone and converting into a captured set of images and into a wire frame of the topographic landscape.

The method or system according to one or more of the previous or following paragraphs includes syncing the topographic landscape to a real world located using a fixed coordinate system.

The method or system according to one or more of the previous or following paragraphs includes providing 5 a set of polygons over the wire frame to form a virtual reality image dataset. The method or system according to one or more of the previous or following paragraphs includes providing a second AR image dataset having less content than the first VR image dataset which is streamed to an AR display.

The method or system according to one or more of the previous or following paragraphs wherein providing a first VR image dataset includes a selecting engageable virtual sandbox which gives an overhead view of the entire topography, and in VR data space topography.

According to a further teaching, a method for training a soldier is disclosed. The method includes the steps of capturing a series of images for a terrain using a drone. The method includes converting the image data series of the terrain into a captured set of images and into a wire frame of the topographic landscape. The method includes syncing the wire frame of the topographic landscape to a real world located using a fixed coordinate system and applying a physics engine to object within the VR image dataset. The method or system includes further streaming a first image dataset stream to a VR display; and streaming a second image dataset to the VR Display. All references cited herein, including all patents, published patent applications, and published scientific articles, are incorporated by reference in their entireties for all purposes. Therefore, an embodiment of the present invention is an input device comprising a user engaging portion; a plurality of positional sensors, the plurality of positional sensors further comprising; at least one pitch sensor; at least one yaw sensor; at least one roll sensor; and a coupling mechanism capable of coupling the input device to a computing device such that the sensing mechanisms can send data to the computing device. In use, a user will sit on, or straddle the user-engaging portion of the device and lean forwards/backwards, lean side/side, and/or rotate the device. These motions by the user will be detected by the sensors and converted to control signal(s) which are transmitted to a computing device and used to interact with the computing device and/or an application (program) running on the computing device.

DETAILED DESCRIPTION OF THE INVENTION

Figure 1:
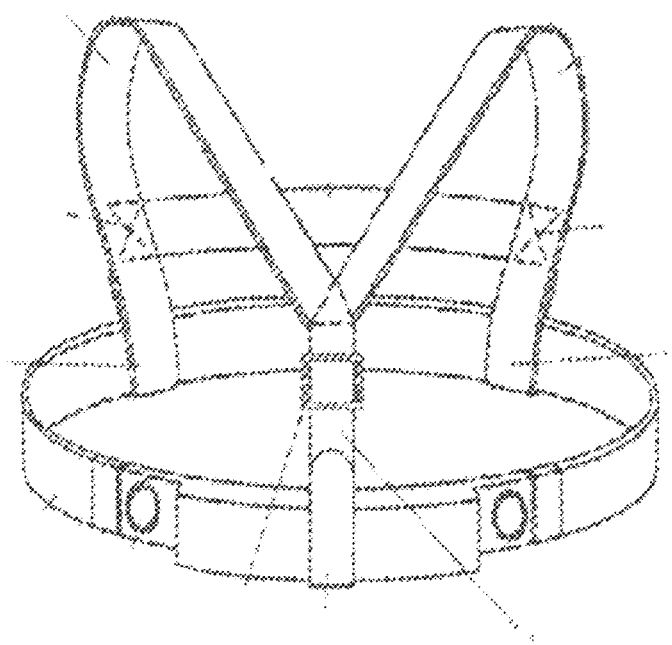
FIG. 1 represents an electronics module having a processors and sensors used for the input devices.

In the following, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether an advantage is achieved by a given embodiment is not limiting of the disclosure. Thus, the following aspects, features, embodiments and advantages are merely illustrative and are not considered elements or limitations of the appended claim except where explicitly recited in a claim(s). Likewise, reference to "the invention" shall not be construed as a generalization of any inventive subject matter disclosed herein and shall not be an element or limitation of the appended claim except where explicitly recited in a claim(s).

The system applies a physics engine to object within the VR image dataset. The VR data set is coupled to a display engine which provides a first VR image dataset stream to a VR display. The display engine also provides a second AR image dataset less than the first VR image dataset which is streamed to an AR display. The training system according to the aforementioned system where the first VR image dataset includes a selecting engageable virtual sandbox which gives an overhead view of the entire topography, and in VR data space topography. The second AR image dataset is polygons for texture and content selectively disposed onto a real world optically viewable surface through an AR display and fourth set of data which overlays a wire frame image over real word surfacing in an augmented reality goggles.

For data input data can come from image or sensor data from man-based sensors, machine-based sensors, Man/Machine. The System can optimize the path of the drone utilizing intelligent CNC cutter-path mathematics to define the path of a data collection drone to most efficiently calculate needed information for a variety of layers in a variety of spectrum. This will allow, the maintenance a constant data buffering rates to minimize data feed rate losses and to maximize program processing speed.

The flight path for the drone can be set based upon the area being photographed. In this regard, when there are large differences between the heights of buildings, a spiral flight path is often best. Additionally, using image object differentiation and shadow lengths. The flight path can be prioritized to take more images or images with a greater image angle where there are features such as roads between buildings and or buildings with large differences in height.

A "Smart Imaging" control for the drone aims to produce an intelligent, optimized drone path. Its functionality can include options for examining data between Z layers—including data feed connections, slope control flight, and geometry identification. To achieve near net shape when imaging, it is important for the control software to understand what changes in surface topology occur between the layers of down-steps. Knowledge of terrain remaining algorithms must look ahead to determine where extra closer imaging-steps are necessary. Smart imaging is how a flight control system images this "between layers" material. By rough imaging in this manner, often the semi-finish pass may be eliminated, saving on drone flight time and computation resources. Smart imaging may also include helical ramping functionality. This is used for pocket imagine.

The helical ramping function determines helical movement based on entry angle and geometry. This function is most important when the imager reaches an obscured area of terrain. It can make the drone path shorter and safer by eliminating unneeded duplication, as a result of tailoring the tool path to the geometry of the obscured features. The sensors can calculate color, distance, heat emission, reflectivity, emissivity, and density. The data can be collected from Air, Land, Sea, and Space (satellite) machines—manned or unmanned. Data layers are mathematically processed into proper formats for system integration for user integration. Layers are created to allow users to observe the machine data in the proper spectrum to allow for enhanced decision-making and proper intuition prompts. Points are tessellated and properly approximated to create a mapping system that represents the area of activity. Optionally when an earth-based frame of reference is not known, for instance within a building. Simultaneous localization and mapping (SLAM) techniques can be used to create VR datasets for unknown areas in cave/mine/indoor rescue scenarios.

With respect to the electromagnetic atmosphere, the VR and MR system can be used to display and show a scan cellular flow of cell phones for enhanced civil planning to track how many cars go which way, as well as the location of various towers. Additionally, Oil—Ground Scans provide locations of minerals/oil georeferenced in the ground to augmented reality. Drilling for water reference local aquifer map while drilling for water wearing AR goggles you can see how close your pipe is in relation to aquifer.

Software and swarm Identify differences in 3D landscape reality to provide prompts on areas of further inspection. An imagining engine or processor contains the ability to combine SLAM with Photogrammetry and older 3d models. In this regard, once a sparse mesh is calculated in photogrammetry, a determination is made if enough tie points are available. If there not enough tie points available, the system can send out a second drone to take more images.

When there is incomplete or old data in high priority areas, the System AI can display prioritized drone flight patterns to focus surveillance detection on differences based on outputs for a difference engine or algorithm. Optionally, heightened scrutiny will be available for 3D landscape and indicators differences and anomalies human activity. The head of an actor or drones can include a sensor package, either virtual or real which provides the system physics engine which indicates where hits are made with weapons calculate probability of lethality and offer indication as to keep shooting or not. Facial and or voice recognition indicates whether bad actor is HVT or pawn. Optionally the intuition prompts show target-to-target head or leg.

Recordings of the movement inside the VR or AR simulator can be monitored by instructors or our public version can be checked for high value targets OTMs. This allows a team to can go back in time and revisit old missions and replay scenarios from raw data gathered before the creation of the model.

The physics engine initiates and references area of activity. The area of activity is presented in several scales. Of which is miniature for an overview/observance and another is full scale for full immersion. The physics engine allows the first user or System AI to have the ability to properly set time, sun/star position and weather effects.

Recordings of users inside the VR simulator can be monitored by instructors or our public version can be checked for HVT OTMs. This allows a team to can go back in time and revisit old missions and replay scenarios from raw data gathered before the creation of a VR sand table. Geo-referenced 3D data for ballistic calculations of probabilities of mortal impact both good and bad side. Percentages of hitting and not being hit shown in Augmented Reality to provide confidence on the battlefield.

Live wind and altitude and angle of shot calculations done in augmented reality. For added Confidence for shooters, the location of indicia for wind speed—flags that can be identified and highlighted in VR, MR, and AR. This allows collectively get better wind data at multiple points in a valley using drones to drift them in the wind. Better-fit ballistic calculations can be suggested to a user using intuition prompts.

The display engine will track all users for easy teleportation within the VR space, the sandbox view represents a Minimap that shows user positions and includes a Rangefinder—Point to Point, User—Identification, a Compass that can be sky compass in VR and AR situations. The first person or commander can walk around the sandbox in the virtual space. The system contains a database of weather options that will affect for example travel speed, visibility. The system can include a back-move button—teleport back to previous location.

Drawing within the system can be done with decals. Each time a ray trace hits a mesh it adds a decal to its surface. Performance can be reduced quickly so optionally, limited the number of decals that can be drawn but more will need to be done here. Ideally the system uses a ray trace to static mesh and gather the UV coordinate of the hit and then add pixels to a "paint" texture at those coordinates. This will mean the only decrease in system speed and refresh rate is the texture memory and a single draw call instead of potentially thousands of draw calls per decal. Multiple users are displayed onto the sandbox view of the VR and in the VR space. To better simulate real world environments, when moving through the VR space, the physics engine will selectively increase resistance (decrease user speed) when climbing hills etc.

With a full understanding of the area of activity and environment variables, proper assessment can be made for the collection of assets or the "ingredients" to the recipe of successful batch of missions. The revision of these recipes will occur by way of intuition prompts that can occur by various features/actions/layers including: walkthrough; collaboration; visualization and preparation. Assets can be queued in the staging area. Assets can include, but not limited to: Boats; Tanks; Aircraft; ATV; Buggies; Motorcycles; Beasts of Burden; and Wildlife, etc. After assets and method are decided, areas can be populated with expected good and bad actors and scenarios run. Actors can be artificial intelligence driven or networked participants who can be in overview or in immersed modes for a full-scale joint simulation.

For a training session in a mixed reality event, such as a shoot house, the AR goggles can have an input such as a QR code which will allow the change to the background of the walls from for example shipping containers or a mud hut, or a Williamston colonial with a picket fence. As is described, data is feed to the AR goggles using the visualization engine. Biometic and reaction data is captured during the event for analysis later.

Playback of the scenario is possible from a variety of camera angles where the operation can be assessed and streamlined to decrease cost from a variety of aspects: Human; Machine; Animal; Monetary. During a training phase in VR, or AR training, the virtual simulation is the ability to rewind and evaluate many scenarios, many times. During the Execution of the Mission, the first user or commander can view the goings on of the mission in VR space. This VR space can be augmented using image data that augments the VR space in near real time. This data can come from satellite and drone imaging data. This data can be used to provide AR Prompts to the users during the mission. For example, data can be live streamed to the war fighter to allow them to avoid collisions on the road during driving or provide better troop location formation with live enemy trackers in respect to live 3d mapping.

Importantly, intuition prompts in the form of information pushed into the AR goggles during a mission can visually alert a soldier to changes in the environment which they may not be aware of. This can be for example the movement of a vehicle into and area, the movement of soil which may indicate the placement of an IED, the visual acquisition of a potential sniper on a roof. Colored decals can be placed into the AR space and visually alert the soldier to the new information.

The AR headset, when used in the field can have a provision which will allow for solider to increase or decrease the amount of information within the goggles or AR screen. The sandbox and augmented reality displays can include goggles; include tablets or cell phones as well as mission planning of the battle space and military manuals. The system can utilize body part sensors in virtual reality and a tank turret. In the mixed reality situations, the system can utilize weapon-mounted sensor for weapon direction.

In the mixed reality situations, a trainee can be evaluated preconditioned conditioned and post conditioned using Virtual Reality, Augmented Reality and/or Mixed Reality so this could turn out to be a testing scenario to filter participants with respect to preferred traits for preferred objective goals/outcome. This can include the measuring biological inputs such as heart rate and reaction times when changes in muscle tension are compared to the timing of visual cues.

The system is backpackable at the scout level and provide hardware connection to other users around the globe. Additionally, maps can be updated in the field by imputing optical and sensor data from hand thrown drones. Enterprise and heavy level hardware and software connection can be provided to allow for cloud-based calculation of the graphics. Geo-referenced intelligence images and cross platform capabilities can be used to provide multiuser support.

With respect to the electromagnetic atmosphere, the VR and MR system can be used to display and show a scan cellular flow of cell phones for enhanced civil planning to track how many cars go which way, as well as the location of various towers.

Images of oil-ground scans provide locations of minerals/oil georeferenced in the ground to augmented reality. Drilling for water reference local aquifer map while drilling for water wearing AR goggles you can see how close your pipe is in relation to aquifer.

Differences in 3D landscape reality to provide prompts on areas of further inspection. As described, intuition prompts identifying differences to users using intuition prompts in the form or VR, MR, and AR prompts to the user. The prompts can take the form of visual cues displayed, text, and haptic output. For example, the system can identify to a user; "I see footprints there" or "I see fresh car tracks" or the ground in that region appears to have been displaced, or there is a hole here that wasn't there but was filled in.

Optionally, these areas can be highlighted visually with a color such as a warning red. When there is incomplete or old data in high priority areas, the System AI can display prioritized drone flight patterns to Focus Surveillance Detection On differences based on 3d landscape and Indicators differences and anomalies human activity. When data is old or incomplete, these areas can be highlighted as being suspect within the VR/AR environment. The System AI can use machine training, machine learning based on anomalies detected over time.

The prompting augmented reality goggle wearing individual which way to face his head to provide more information on newly found difference. During the mission in AR and MR, intuition prompts not limited to just humans. Intuition prompts can be provided for animals such as for dogs. These intuition prompts can be made via vibration, tones (audible and inaudible to humans), and radio communication. Optionally, sensor platforms can be integrated onto the animal using harnesses of for example dog helmet cameras.

Different type of Geo-referenced 5 Data can be combined in a fashion that is best understandable to humans in AR VR. For example, it better to show white hot thermal people on top of colored visible camera textured 3d models or red outlined movements noticed by LIDAR. In another example, if there is a VR dataset that corresponds to a physical topography, each having a desk, and a first user places an object on the desk in the VR space, a second user, when viewing the desk through an AR display will see the object on the real desk. Similarly, the systems engines can provide data directly to the AR goggles in the real world to augment a soldier's situational awareness and provide intuition prompts.

The AR and VR screens can display where hits are made with weapons and can calculate probability of lethality and offer indication as to keep shooting or not. Facial and or voice recognition indicates whether bad actor is High Value Target or pawn. Optionally the intuition prompts show target-to-target head or leg. Additionally, AR medics can be positioned with the AR goggles to interact with an injured soldier.

The display engine will track all users for easy teleportation within the VR space. The sandbox view represents a Minimap that shows user positions and includes a Rangefinder—Point to Point, User—Identification, a Compass that can be sky compass in VR and AR situations. The system contains a database of weather options that will affect for example travel speed, visibility.

Disclosed is a method of sharing a three-dimensional virtual reality space among a plurality of users. The method contains the steps of first, acquiring a plurality of images of a geographic region using a mobile platform. Second, photogrammetry is used to create a first set of three-dimensional graphics data associated with a geographic region to be used by the plurality of users in a shared manner. Next, the three-dimensional graphics data is functionally cooped to a physics engine configured to physical rules to objects within the virtual reality dataset. A display engine is coupled to the physics engine to convert the dataset into first and second content streams. Either one of the first content streams and second content streams from the three-dimensional graphics data is the presented to one of a table, a computer, or to a VR headset.

The first content stream can include streaming a rendered topographic landscape. Alternatively, streaming a second content stream can include streaming the second dataset has an augmented reality content that is less than the content of the first dataset.

As previously discussed, capturing a series of 5 images for a terrain using a drone and converting into a captured set of images and into a wire frame of the topographic landscape. The topographic landscape can be synced to a real world located using a fixed coordinate system. A set of polygons are provided over a wire frame to form a virtual reality image dataset.

The first VR image dataset can include includes a selecting engage able virtual sand table which gives an overhead view of "gods view" of the entire topography, and in VR data space topography. The second data set can be engaged, by selectively pointing to a spot on the sand table with a VR pointer to "move" the user into the second VR space represented by the 3d area in the map. This allows the user to traverse inside the vr second space in room scale.

A system for training a person according to the present teaching includes a camera or cameras used to capture a series of images of a terrain. These cameras are mounted on a mobile platform which can be a drone or a terrestrial based vehicle. The images are transferred to a computer using a cable or a memory card. The computer preferably has a GPU to efficient handle the data. The images stored in a file structure are converted using photogrammetry into a 3d model of the terrain. This 3d model formed from the image data series of the terrain is converted into a wire frame of the topographic landscape. The wire frame is synced to the topographic landscape to a real world located using a fixed coordinate system within a VR system. A physics engine is used apply structure to objects and topography found within the VR image dataset.

A first image dataset is streamed to a VR display which represents a tent or a hanger having a "table sized" map of the terrain disposed several feet off the floor of the virtual space. An overhead 2d map to the area is formed and positioned on the wall of the hanger or room. Additionally, streaming content from for example the internet or a software defined radio can also be placed in the first VR space.

Additionally, a pointer in VR can be used for instance to accurately determine things such as shot distance and angles between two points. These didcances can be correlated for image correction with know distances in the real world. A user or users can surround the virtual sand table representation of the terrain and can use virtual tools such as paint brushes to paint infill and exfiltration routes, place vehicles such a helicopters, or Humvees, or rally points. Images from drones can be directly superimposed onto the mesh for "image" feeds. Which will give the 5 VR either in the Room scale or in the "hanger" a view of what is happening "live." This is of course subject to the normal latency in the system.

The system which is used to convert video streams from drones into a 3d or 2d output. The video streams are formed of a series of images which can be compressed and an associated set of meta data. The meta date can hold for example information regarding the mobile platform such as the drone type, the orientation, altitude and speed of the drone. Additionally, the meta data can contain information related to the camera type, focusing measurements, and angles and position of the camera with respect to the drone or ground. This meta data and thumbnail images for reach frame are copied into separate data tables which are relationally bound using a film frame reference number. It is often the case that the metadata does not include information needed to assist in photogrammetry.

Furthermore, the metadata may not be in a format (such as EXIF) which is used by the photogrammetry transforming software. This metadata for each frame can be transformed and saved into a second data table which is relationally bound using a film frame reference number. This transformed table can be filled with data which is calculated from data stored in the first data table. For example, the focal length can be transformed using the following formula:

Angular Field of View (degrees)=2×tan−1 (h/2f); where h is the height of the imaging sensor.

Where f is the focal length which is usable by the photogrammetry processing. This data is used in the photogrammetry portion of the system to transform the images into a mesh as well as 2D and 3D images. Once the images are separated, the Meta data is used to segregate the data into separate sets. These discrete sets will be used separately to be run through the photogrammetry engine. In this regard, the images and metadata in the first and second data tables are separates into groups. The segregation occurs based on data stored in the Meta data. The system will incrementally through the metadata for changes in data such as a change in focus, a change of angle of the camera with respect to the drone, or earth. Once a "new set" have been started, the system will increment through the images until it comes across a new set of images based on the aforementioned changes in the camera's relation to the drone body or the ground.

Each of these segmented sets of images can be separately evaluated. If a single segment has too many files for effective transformation into a 3d and 2d map a subset for these images can be used to transform the data. In 5 this regard, every 5th or 12th image can be used. Additionally, in situation where a pilot is changing the focus on an object or changing the field of view, the photogrammetry portion of the system can treat this as a separate and independent camera. Multiple subsets of photos can be used to form the mesh and the 3d image.

Also associated with each from can be additional metadata such as indicators of what might be found in a particular frame such as from AI. The AI can use machine vision techniques to label information of those things within a particular frame, such as a plane, tank, and rocket launcher.

To allow for the searching of images within the database, the system allows for the formation of a mathematical model which represents an image being investigated. The search image of interest is converted into a digital format for processing by a computer. This image is input into the computer as an image file or can be scanned using known techniques. Optionally, key words are associated with the image file. These key words can be associated with the goods or services related to a product.

The series of master transformation and analysis are conducted on the image file. In this regard, if necessary, the image is transformed into a grey scale or black and white image. As the master image file is expected to be of high quality, it is envisioned that needed image transformations will be at a minimum.

A series of analysis are run on the master or transformed image to characterize an object or objects depicted in the image. Properties such as centroid of the object, the object's aspect ratio, spline equations which describe parts or all of the object's edge, and character recognition can be run.

A correlation matrix is formed from the results of the analysis. The system evaluates the features or analysis, which best distinguishes the object being detected. This analysis can be for example a convolution solution such a convolution integral. In this regard, a convolution solution is a mathematical operation that combines the output response of a system to individual responses. In this regard, a solution or solutions is conceptually a fold, shift, multiple or summation of individual discrete, scaled, time-shifted impulse responses. Analogously, this maps to a multiplication of the functions in the frequency domain.

Efficiency and applicability of the methodology arises from the commutative property. Included (see end of document for the Pattern Classification Decision algorithm) is an adaptive learning algorithm that extends, 5 in addition to the convolution solution, heuristic method that abstracts and generalizes to the degree to that it interprets the overall results. To reduce computational load in the future, those features having the highest likelihood of being able to distinguish the object are used to search for images as described below. These features represent a subset of the correlation matrix or a test function set.

Optionally, the system will ask whether the detection of rotated objects is required. In this case, the system will optionally rotate the master image about a predetermined axis, at a predetermined angle, a predetermined number of times. For example, the image can be rotated at plus or minus 5 degrees for 0 to 45 degrees. These rotations can occur about a centroid of the image to accommodate for scanning errors or can be located at a centroid away from the image to represent a 3d rotation in space. When the axis of rotation is located away from the image, it can be perpendicular to or within the surface of the image. All of these rotated images can then be run through the analysis system as described above.

It should be understood that the order of processes can be altered as desired. It is envisioned that those analysis techniques which have been deemed proper for one image may or not be deemed proper for its rotated analogues.

The system allows for searching images within a distributed network or database. The distributed network is run based on key words. This will significantly reduce the number of html pages to be evaluated. A determination is made if files on the target list have associated image files. Should there be associated image files, the images are downloaded for further analysis.

An initial evaluation of the images is conducted. In this regard, simple evaluations are conducted as to the determination if the image is larger than a predetermined size. By way of non-limiting examples, further preliminary analysis can be conducted to determine if images contain too many colors or if the color content is correct. For those images to be deemed worthy of analysis, the system can convert the images into grey scale.

A series of analysis are run on the images to determine how close the image is to the master image. In this regard, it is envisioned the image can be processed to segregate individual areas of a downloaded image for analysis. This segregation is performed using edge detection techniques. It is envisioned the system will conduct edge detection such as, but not limited to, convolution, converging square systems, or other edge detection techniques. To improve the success of the edge detection, the image can be preprocessed 5 prior to analysis using edge enhancement and field flattening techniques.

Once portions of the images are segregated, each of the test functions can be run on the individual segregated image portions. Each image portion having its own correlation matrix can be then ranked for review after being compared to the correlation matrix of the master image.

The correlation matrix can be formed using the analysis. It should be noted that to improve computational efficiency, a subset of the analysis of those used can be used to analyze the image in the distributed network or database. This subset can be, for example, those analysis techniques determined to best correlate the master image. To increase the accuracy or robustness, the number of analysis techniques can be increased. The results of the correlation matrix the components of the image can then be compared to the master image correlation matrix. The correlation matrix for the varied components of the varied images can then be ranked for human evaluation. It should be noted that the images being evaluated can be compared with correlation matrices of the rotated images should this be desired.

In an example implementation of a system according to the present disclosure is depicted. Clients and send image file access requests to a load balancer. The load balancer assigns the image file requests to one of proxy servers. Although more or fewer proxy servers can be used, three are shown for purposes of illustration only.

The proxy servers retrieve and store large files from and to a storage system. The large files are aggregates of image files. In various implementations, proxy servers provide an interface between image file accesses and large file accesses. In other words, the proxy servers interact with the clients in terms of image files and interact with the storage system in terms of large files video files.

The clients are graphically depicted as a personal computer and a server, respectively. However, in various implementations, clients can take many other forms, such as mobile devices which rung image presentation software such as ATAK. Further, although the term client is used, the client may not be the end consumer of information/data in the image files. For example, only, the client may be a web server that retrieves small files and presents them as part of a web page or web application to end users. This can be run on for instance a Linux LAMP server.

A simplified block diagram of selected components of the client is illustrated for example only. Although depicted with respect to the client, similar or identical components can also be included in other clients, such as the client. The client, in this example, includes a processor that executes instructions stored in memory and/or nonvolatile storage. The processor communicates with a network interface. When the processor decides to access a small file, such as based on a user requested new content, the processor 402 transmits a small file access request to the load balancer 430 via the network interface 408.

In various implementations, the load balancer 430 may appear as a single server to the clients. Alternatively, the load balancer may be bypassed or omitted, and the clients may communicate with one or more of the proxy servers. For purposes of illustration only, selected components of the proxy server are depicted. In this example, an access module receives an image file access request via a network interface.

The access module determines large files corresponding to the specified small file according to a selection function from a selection module. The selection module may configure the selection function so that files expected to be accessed contemporaneously are grouped into a large file. For example, only, files related to a web page may be grouped into a large file. Similarly, files that may often be accessed in succession as a user navigates a website may be grouped into a single large file. The access module 446 then accesses the corresponding large file from a storage cache 452. When the storage cache 452 does not include the large file, the large file is read from the storage system 460.

For purposes of illustration only, the storage system is shown as including a network interface and file module. The file module may implement a variety of file systems, such as FAT, NTFS and/or ext2. The file module may include a variety of nonvolatile storage media, such as tape optical disk and magnetic storage. The file module may implement a variety of storage techniques, such as RAID (redundant array of independent disks). The file module may be unaware of the content of any of the large files and simply treat them as standard files.

Image data processing generation, specially adapted particular applications. This can include indexing scheme image analysis image enhancement; special algorithmic details; image segmentation details; active shape model. The system can be specially adapted for particular applications and can include geometric image transformation plane image, bit-mapped bit-mapped creating different image.

Image data processing for the VR and AR goggles can include generation can include specially adapted particular applications including image analysis, bitmapped non bit-mapped, depth shape recovery, 5 multiple images, multiple light sources, and photometric stereo.

Real-time bi-directional transmission motion video data can be accomplished using network structure processes which are specifically adapted to use a video distribution server and client remote clients. Data switching networks and wireless communication networks can be used for control of signaling. Basic layer enhancement layers can be transmitted using different transmission paths, setting peer-to-peer communication internet remote stb's. Communication protocols including addressing, signaling, control architecture real-time multimedia is used to maximize throughput.

The system can use peer-to-peer communications with control signaling network components server clients, network processes video distribution server clients, controlling quality video stream, dropping packets, protecting content unauthorized alteration network, monitoring network load, bridging different networks, ip wireless. The control architecture allows for near real-time multimedia communications.

The system can use a broadcast conference packet-switching network including real-time bi-directional transmission motion video data. Servers are specifically adapted distribution content, vod servers; operations; management operations performed server facilitating content distribution administrating data related end-users client devices, end-user client device authentication, learning user preferences recommending movies. The system provides integrated maintenance administration data networks.

Broadcast communication is managed using circuit systems communication control processing protocol. The use of Broadcast conference packet switching networks in real-time in bi-directional transmission motion video data specifically adapted video distribution server client remote clients. Data switching networks and wireless communication network including a video encoder decoder, transmission management data server client, sending server client commands recording incoming content stream. The Protocols client-server architecture is specially adapted downstream path transmission network.

As previously mentioned, the system provides selective content distribution arrangements, apparatus, circuits, and systems communication control processing protocol. Broadcast conference packet-switching networks are used for the real-time bi-directional transmission motion video data and generation processing content additional data content creator independently distribution process. Arrangements generating broadcast information, the assembly of content and the generation multimedia applications.

Electrical digital data processing using where computers computation affected self-contained input output peripheral equipment. Optionally, impedance 10 networks using digital techniques, error detection, error correction, monitoring, and methods for verifying correctness marking record carrier can be used. Error detection and correction of data is included using redundancy hardware or using active fault masking. The system will automatically switch off faulty elements and switch to spare elements. Interconnections communication control functionality redundant; flexible 15 arrangements bus networks involving redundancy. Defective hardware can be detected and located by testing during standby operation idle time, start-up.

Database structures are provided containing file structures for data processing systems. Methods specially adapted administrative, commercial, financial managerial, supervisory forecasting purposes. The system uses data structured data 20 stores including storage indexing structures; management. The engine uses computers computation effects the input output peripheral equipment using indexing scheme relating accessing, addressing allocation memory systems architectures; details cache specific multiprocessor cache arrangements.

The AR system allows for the management of power consumption, 25 standby mode; power saving data processing device general and wake-up procedures. Recognition data and methods arrangements reading recognizing printed written characters recognizing patterns, fingerprints; processing analysis tracks nuclear particles and chemical constituents, molecular sequences; radio frequency.

The visualization engine allows for the system to utilize recognition field 30 perception and scene-specific objects. Image and video retrieval and image analysis and image segmentation are included. Pixel labelling and alarm systems, traffic control, pictorial communication, recognizing scenes, perceived perspective of the user. The system allows for the recognizing of patterns in remote scenes, aerial images, vegetation versus urban areas; radar similar technologies; segmentation general image 35 processing; using hyperspectral data, i.e. Wavelengths rgb.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art 5 that specific details need not be employed, that example embodiments may be embodied in many different forms and that neither should be construed to limit the scope of the disclosure. In some example embodiments, well-known processes, well-known device structures, and well-known technologies are not described in detail.

Addressing the ability to suggest or even force movement of the user. In some embodiments, the use of vibrational stimulators provides feedback to the user. This allows for force feedback, which in VR, could be implemented as director's nudges/encouragement to ensure that the participant is not missing key cinematic or other important events. 15

The system is configured for optimizing a flight plan for an aerial and or mobile observation platform. In this regard, the flight plan can be optimized to maximize one or more of several different results. The first can be, what is the shortest flight path above a specific topography which allows the minimum number of 2d or 3d (lidar) images which can be used to form a three-dimensional dataset of a surface or 20 topography at a desired image quality. The second can be, what is the flight path or paths which maximize the time a mobile platform can observe the most area or surfaces at any given time at a desired image quality. Another optimal path can be the avoidance of regions the platform or camera cannot operate optimally. For example, acoustical requirement, or danger.

The system utilizes a low-resolution 3d wireframe or sparse map of a topography of interest, covered with faceted polygons to define surfaces. This resolution can be for example (1 pixel per meter). The low-resolution map is placed into a 3d physics engine such as, by way of non-limiting example, an Unreal Engine. An air space of 3d locations is defined above the map of the topography of interest. Included in this airspace is a floor limit, which can be set, based on safety or noise requirement of the mobile platform. Also included is an upper limit, which can be set, based on the camera requirements or operational parameters of the mobile platform to allow the desired image quality (for example less than 1 pixel per ground 2 cm and more particularly less than 1 pixel per ground 1 cm).

As described below, the system uses ray tracing to determine which locations in the space of 3d locations are optimum for capturing images of the terrain. Once the system determines which locations are optimum, a 3d traveling salesman solution is defined to determine which optimum (shortest) flight path is needed to capture the minimum number of 2d and 3d images needed to form the high resolution 3d image. Or if an optimum flight zone is determined, the central location of this zone can be used to reduce error. By way of non-limiting example, the system can have a computer which implements one of the following solutions to the traveling salesman problem. Various branch-and-bound algorithms, Progressive improvement algorithms, 10 Implementations of branch-and-bound and problem-specific cut generation, this is the method of choice for solving large instances. A cutting-plane method based on linear programming, a Concorde TSP Solver.

For each location in the air space of 3d locations, a projection is recursively made onto the space low-resolution surface. The system determines which 15 triangles are visible from each location in space. Each location in the space of 3d locations is then sorted to determine at which location the largest number or surface area of triangles is visible as well as the smallest number of triangles are not visible because of obscuration. A cluster of these locations is then stored in a separate memory location or tagged as primary imagining points. These observable n-gons will 20 be labeled "unobscured." The system will then determine which locations within the air space of 3d locations has an unobscured path to the largest number of "obscured triangles." A cluster of these locations is then stored in a separate memory location or tagged as secondary imagining points. These now observable triangles will be labeled "unobscured." The system will continue to recursively evaluate locations in the air 25 space of 3d locations until a point where the number of obscured triangles is below a predetermined threshold.

Optionally, the reverse process is possible, where observations are made "from the triangles" to determine which are the locations in the air space of 3d locations which are available. Once a series of locations the air space of 3d locations where the 30 number of obscured triangles is below a threshold. The system uses a 3d traveling salesman solution to solve which is the shortest path in space of 3d locations.

It should be noted, that the solution is fairly straightforward when utilizing a rotator lift aircraft such as a quad copter. When using a fixed wing, the relative distance between points in airspace changes depending on the angle of attack of the location in space. For example, the kinematics such as speed and inertial of an aircraft may limit the angle of the approach in a manner such that the aircraft will need to turn around and approach a near neighbor observation location.

Once optimum path is determined, the flight plan and imaging plan is loaded into the aircraft. A breadcrumb trail of images can be taken at a predetermine frequency to ensure proper image overlap to assist in 5 stitching together the images, as can be done in photogrammetry and lidar map construction.

Figure 7:
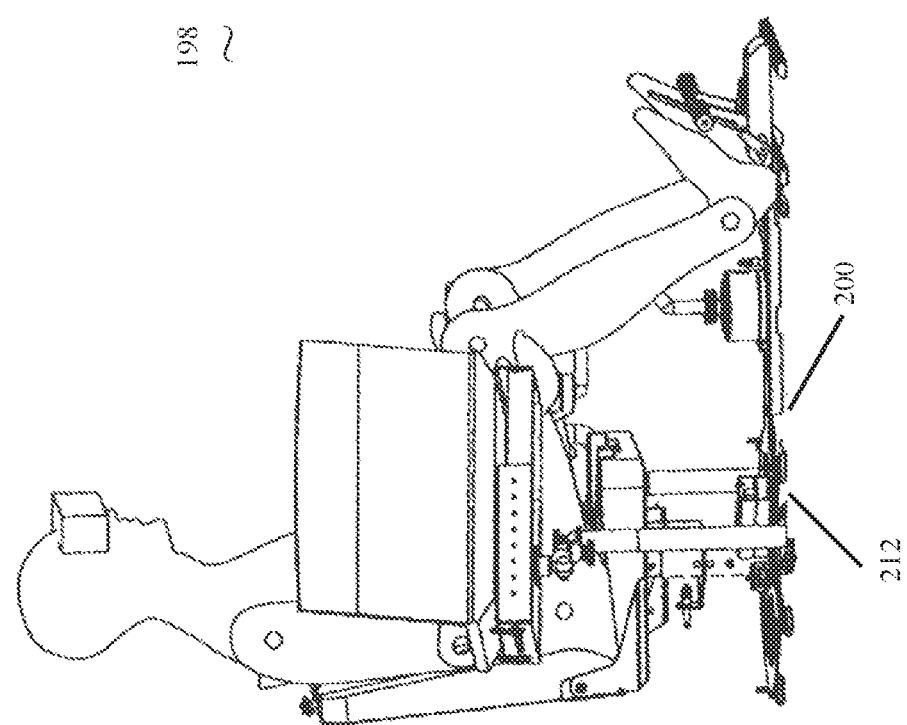
FIGS. 7a and 7b represents the system shown in FIGS. 1-6 in a collapsed foldable configuration.

Additionally, it is envisioned that the above system can be used to determine the best locations from legacy video streams to construct 3d maps, such as the images discussed above with respect to FIGS. 7 and 8. In this situation, the 3d 10 airspace locations will be limited to those locations where images have been taken from the legacy map. This reduced subset of locations will be used to determine the minimum number of locations, and thus images from the legacy data, which will be needed to transform the legacy data into 3d maps.

Throughout this specification, plural instances may implement 15 components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example 20 configurations may be implemented as a combined structure or component. Similarly, structures and functionality presented as a single component may be implemented as separate components. These and other variations, modifications, additions, and improvements fall within the scope of the subject matter herein.

The control system may be deployed on a variety of different devices. For illustration purposes, an VR trainer system 198 will be featured in this example. The VR trainer system 198 is positioned on a surface which can be a mobile platform such as an aircraft 199. Once engaged, the VR trainer system 198 simulates the movement of a vehicle on a trajectory dictated by the human interface devices 204. In the case of the VR trainer system 198, the vehicle can follow its own guidance system and operates under its own propulsion. The control system disclosed here provides a deployable VR training system which can be used to rehearse a flight training of numerous numbers of vehicles.

To allow folding and transportation of the trainer 198, the base 200 is formed of more than one generally plainer member 210, which are coupled together by at least one hinge 212. As shown in FIGS. 3 through 7b, the base 200 has a display support number 214 and a plurality of human interface devices coupling interfaces 216.

The system allows for the fast and easy customizable change of a trainer by simply changing the human interface devices at the couplings. In this regard, each human interface device has a specific coupling electronic connector which is accepted by the coupling. Depending on the pin output and data being sent through the connector, the system will acknowledge which human interface devices are being used and project onto the computer screen possible vehicles to be used in the training system. As can't be seen, the sticks and armrest can be specifically designed to have button inputs which mimic those of the real vehicles being flown or deployed.

The system is specifically designed to have a virtual reality headset which allows the user to turn her head while flying or controlling a vehicle through a scenario in virtual reality. Additionally, it is envisioned that the system shown in FIGS. 3 through 11 can be used to control drones or unmanned vehicles.

Figure 2:
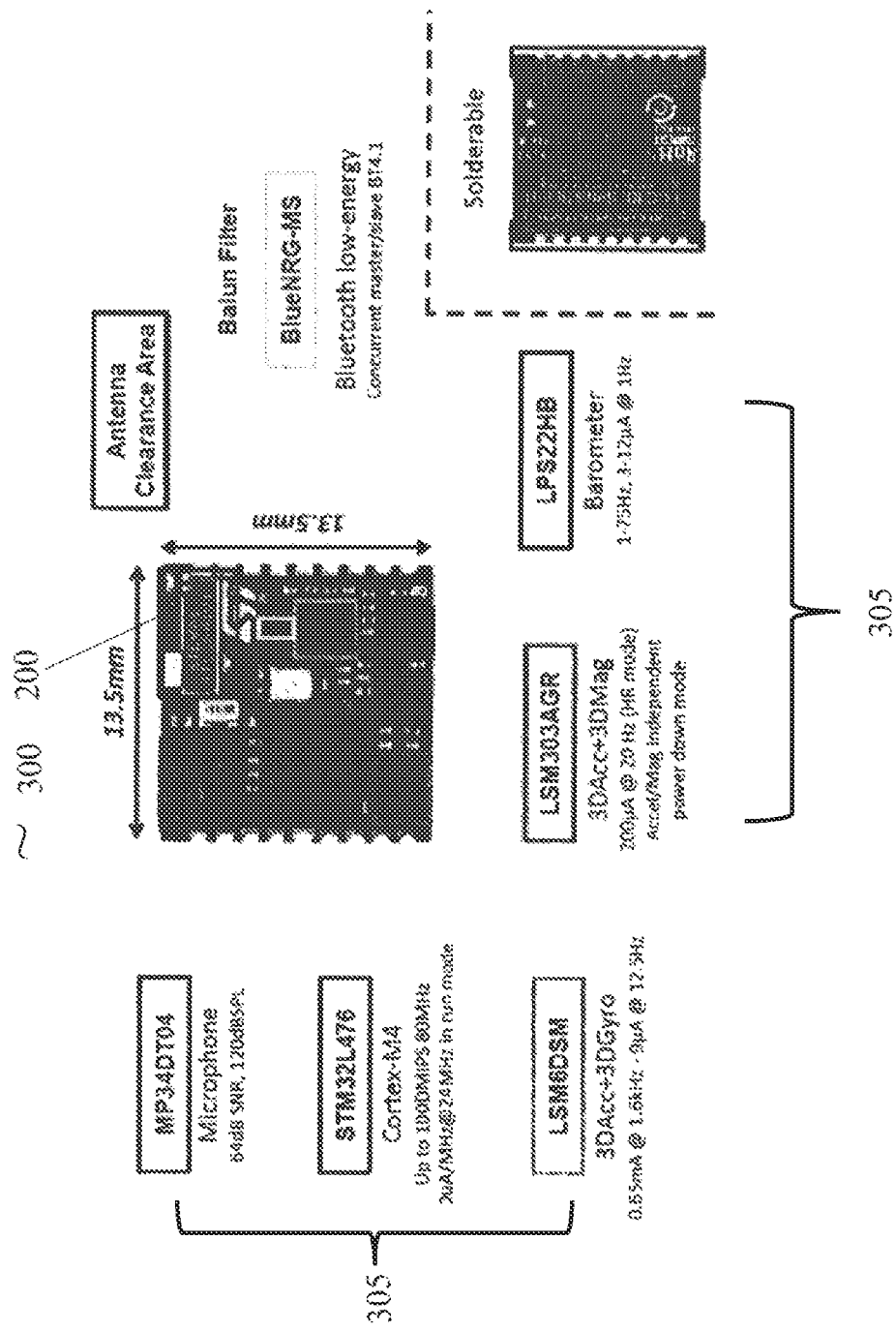
FIGS. 2-6 represents a virtual trainer and control device according to the present teachings.
Figure 3:
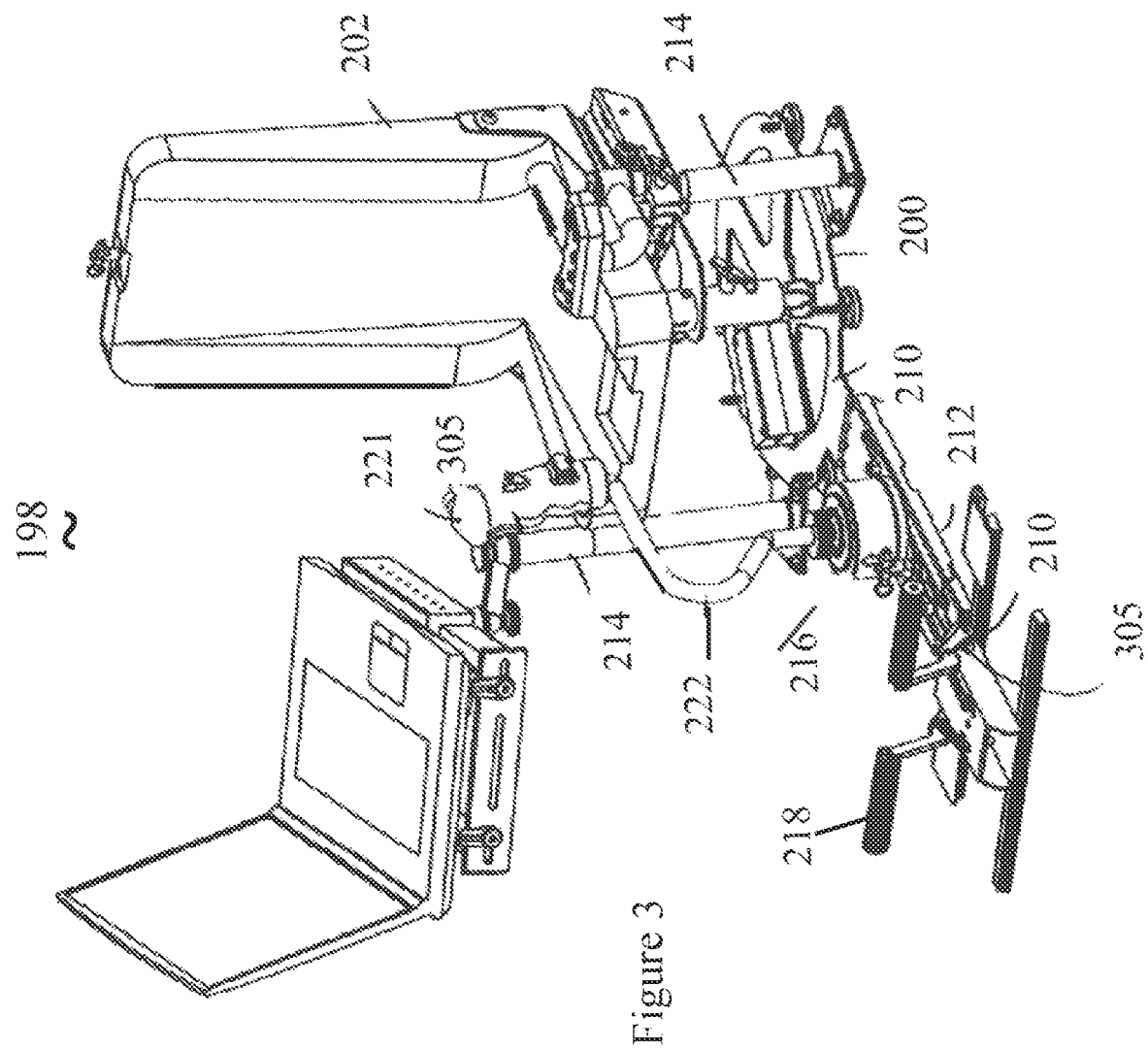
Figure 4:
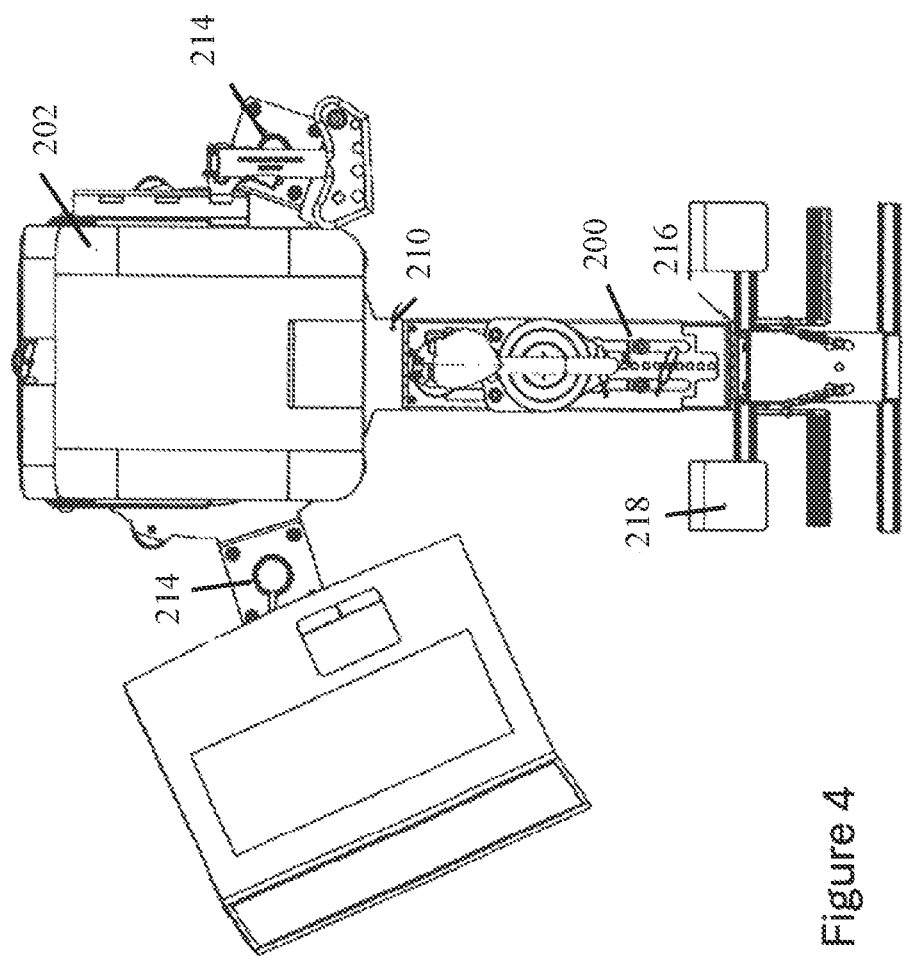

FIG. 2 shows an exemplary electronics package at 300, which comprises a set of axially aligned, interconnected circuit boards which comprise the respective sensors for single or multiple axis human input devices. These systems are preferably performed using their own dedicated subsystems, with power supplied to all subsystems from a common power source. Note that the human interface devices and VR headset system is coupled to the control system through a computer, to allow the control system to control whether the human interface devices can be safely engaged. The control system is responsible for determining which vehicle is being simulated or controlled by looking at the pins associated to an electrical connector associated with each Human interface device. In other words, the system uses its own accelerometers, gyroscopes, radio receivers, GPS receivers and the like; for reliability and fail-safe reasons these system components are preferably not shared with the control system. As best described below, the base member has a 9 DOF sensor set 305 which includes a magnetometer and a thermometer which is used as a reference in case the base member 200 is placed onto a moving platform.

The exemplary electronic circuit board package 300 generally is used to measure the angular position of a seated user. In this regard, the package can be configured to measure the relative change in of a user with respect to the reference frame. In this regard, the package sensors can be used to measure the change in angle of the user's thighs or hip about an axis parallel to the floor or the earth's surface, as by measuring the change in angle of a top or bottom surface of the seat bottom or seat support structure. This change in angle, in the forward or reverse direction is measured, and is translated by the system into an output signal that is used to move a user's perspective within the augmented or virtual reality environment.

As opposed to simply measuring rotational or linear acceleration to determine the changing in angle, the electronic circuit can have for instance an IMU that has at least a tri-axial accelerometer package. These accelerometers can use the earth's gravitational pull and the rotation of the accelerometers about an axis parallel to the earth's surface and with respect to the gravitational line of action to determine rotation of the electronics package. This relative rotation of the accelerometers with respect to the gravitational lines can be used to generate a forward or back signal which is used to, in the forward or reverse direction is measured, and is translated by the system into an output signal that is used to move or change an image with the augmented or virtual reality environment. Noise put into the accelerometers can be removed by use of a low pass filter, which can remove movement components of the accelerometer signal, and allow the measurement of only the unchanging earth gravitational signal.

The electronic circuit board 300 can be physically and separably coupled to a chair to measure rotation of an user. In this regard, the electronic circuit board can be placed on a seat bottom structure. The board can be for instance directly coupled to the seat bottom using a selectively releasable structure or material. This can be for instance can be Velcro™ or a selectively releasable bracket.

Figure 5:
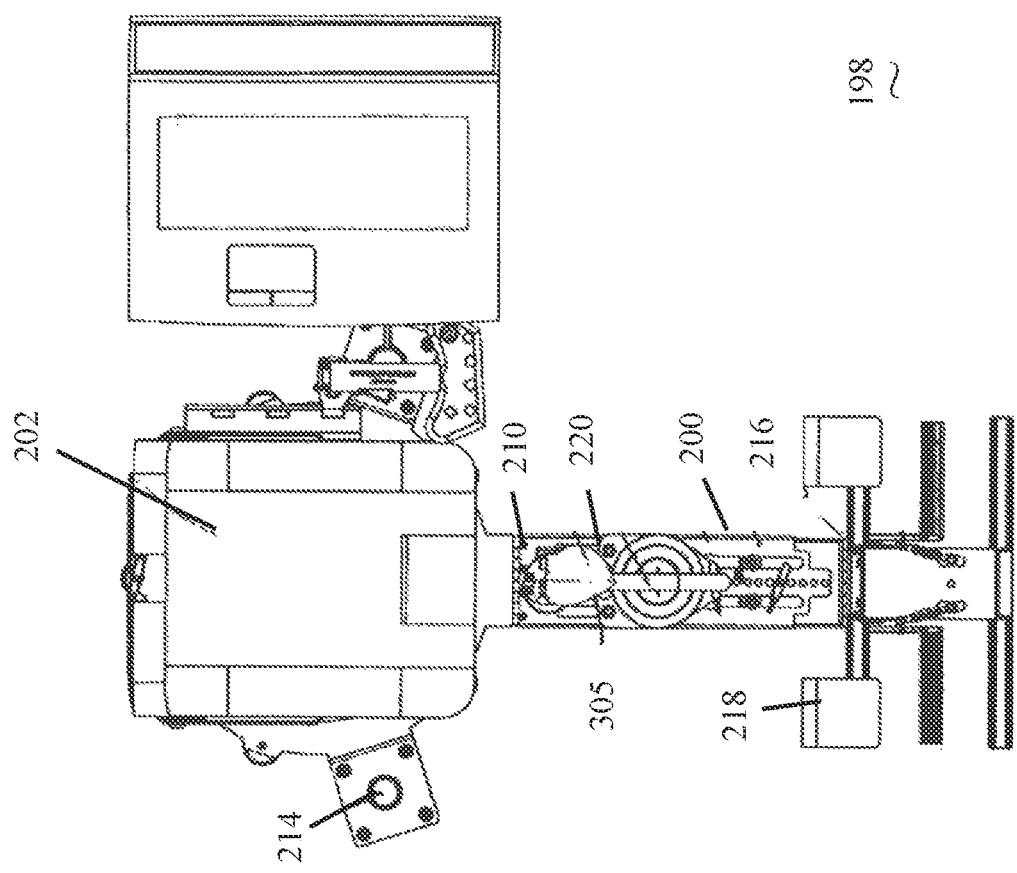
Figure 6:
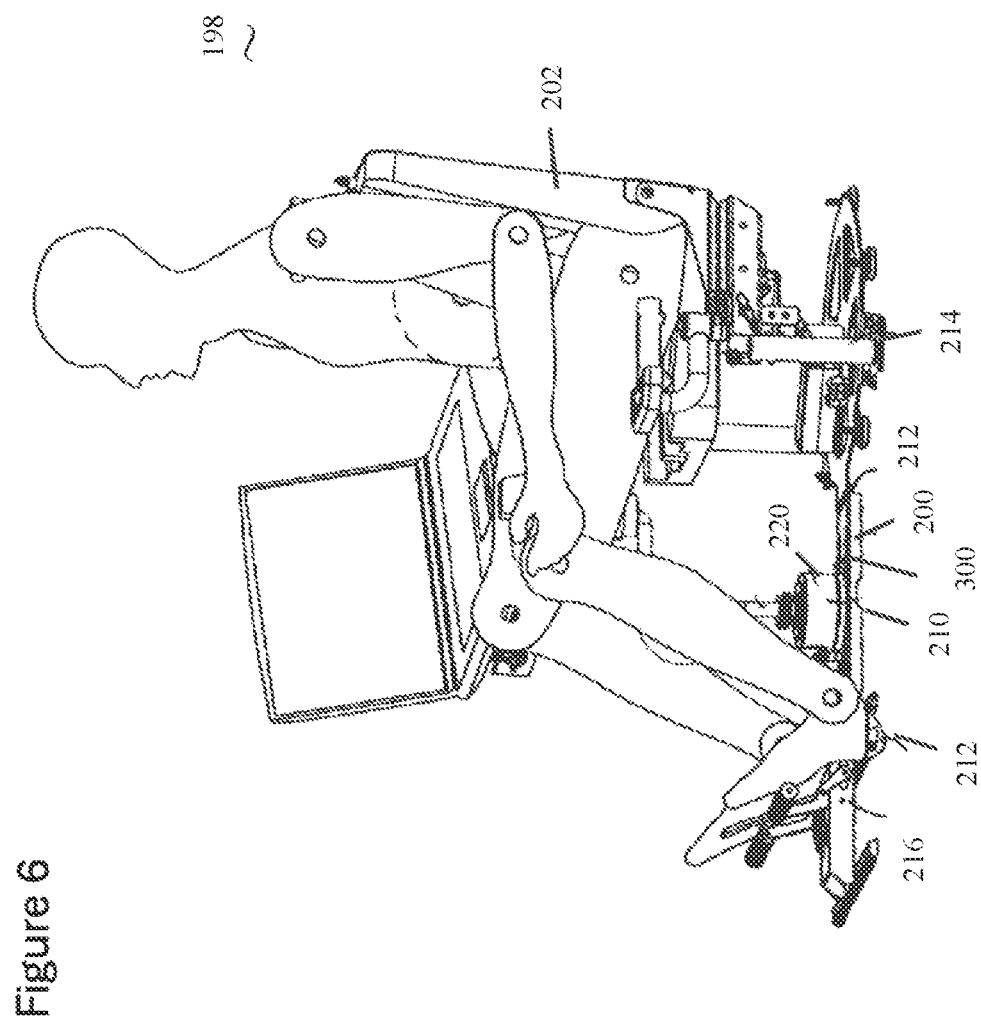

The circuit board 300 can be located near the pivot point of a seat and support interface or can be located at a front or rear edge of the seat bottom or support structure. Additionally, the circuit board can be located on a seat back support structure. As shown in FIGS. 5 and 6 the coupling of the circuit to the seat back structure allows a user to lean backward to affect a large signal. Optionally, in the case of for instance a vehicle simulation, leaning in a rearward direction can impart forward movement. The addition of gravity in this configuration can simulate forces encountered due to acceleration, thus reducing the chance of sickness caused by disruption of the vestibular system.

The circuit 300 can be used as an input device for manipulating a streaming image, for a seated user. The input device includes, a floor engaging member having a floor engaging surface and a longitudinal axis generally perpendicular to the floor engaging surface. Disposed between the user and the floor engaging member is a support structure having a seat support surface generally parallel to the floor engaging surface. A bearing is disposed between the support structure and the floor engaging member. It is configured to allow relative rotation of the support structure about the longitudinal axis with respect to the floor. A seat support is provided which can support a seat cushion. A joint, having a neutral, a forward, and a reverse configuration, is disposed between the seat support and the support structure, the joint pivotably coupling the seat support surface to the seat support in a manner which restricts the rotation of seat support with respect to the seat support about the longitudinal axis and allows for the rotation of the seat support in a pair of directions perpendicular to the longitudinal direction. A circuit having a plurality of accelerometers configured to measure a component of gravity, each accelerometer configured to provide a signal indicative the component of gravity, said circuit configured to measure changes in at least one of the signals indicative of a gravity component and provide an output signal indicative of the rotation of the seat support with respect the seat support surface.

The plurality of accelerometers is configured to detect the movement of the seat support and are radially disposed about the longitudinal axis at a first radial distance from the longitudinal axis. Optionally, the input device has at least one magnetometer configured to provide a signal indicative of a direction with respect to the earth's magnetic field. An IMU can be operably coupled to the plurality of accelerometers and the magnetometer. Optionally, a rotation sensor configured to measure relative rotation of the seat support with respect the floor bearing surface and provide a signal thereof. As described above, the input device can have an output device having at least one piezoelectric actuator configured to provide a vibrational output.

The input device includes a plurality of first sensors configured to measure changes in orientation of the seat by measuring components of gravity indicative of movement of the seat support with respect the seat support surface and provide a signal thereof, and a rotation sensor configured to measure rotation of the skeleton support structure with respect to the floor. The rotation sensor can contain a magnetometer.

In use the system provides method of displaying a three-dimensional virtual reality space for at least one user, the method includes the steps of receiving a plurality of signals from a plurality of accelerometers configured to measure a component of gravity, each accelerometer configured to provide a signal indicative of the gravity component. Changes in at least one of the signals indicative of the component of gravity is calculated by subtracting successive changes in the measured value in time. An output signal indicative of the rotation of the seat support with respect the seat support surface is provided.

The system then acquires three-dimensional graphics data associated with a geographic region to be used by the plurality of users in a shared manner and an update object whose state is updated according to an operation performable by each of the plurality of users. The three-dimensional graphics data is functionally coupled to a physics engine configured to physical rules to objects within the virtual reality dataset. A display engine is coupled to the physics engine to convert the dataset into first and second content streams. A first content set from the three-dimensional graphics data is streamed to a VR headset and a second content set three-dimensional graphics data to the VR headset. The first content set in the VR headset is changed in response to output signal indicative of the rotation.

The afore mentioned circuit can for instance be mounted to a user's chest or back using an appropriate strap or support harness. In this configuration, the circuit can be used to measure and calculate the changes of angle with respect to ground (measuring the direction of gravity described above) or can be used to measure the relative heading of the user with respect to the earth's magnetic field. As described above, the measured changes of the chest or back about an axis parallel to the earth's surface or about the earth's gravitational line that is perpendicular to the earth's surface.

The VR system 306, Human interface devices, and the sensor 305, operate upon data in three dimensions and three axes of rotation. This is because the reference frame of each of these sensors may potentially undergo not only translations in three-dimensional space but also rotations about each of the pitch, roll and yaw axes.

Depending on the human interface device 204, the human interface devices coupling interfaces 216 have a selectively engageable mounting members having selectively engageable degrees of freedom. In this regard, one human interface device can be a pedal, or pair of pedals 218 which can rotate about a single axis. Alternatively, one coupling interface 216 can accept a central stick 220 which can be selectively constrained for single or two axes of rotation. The stick can accept a plurality of handle grips 221 which can be configured for a specific vehicle. The human interface device accepting coupling interfaces 216 are configured to hold many types of human interface devices such as a single stick, a pair of control sticks, foot pedals, or rotatable steering wheels. Depending on the type of vehicle being used in virtual reality, different human interface devices will be coupled to the human interface device couplings 216 and onto the base 200. This allows a single VR interface system 198 to be used to simulate and control many VR vehicles remotely.

The base can be positioned on top of any flat surface such as a floor in a building. Additionally, it can be fixedly couples to the floor of a mobile platform such as a Humvee or and aircraft such as a C-130. The use of the virtual reality system allows for multiple users to be seated in a similar system to have a shared experience within virtual reality. In this regard, the seating systems can be configured for a pilot in one configuration or hey copilot in A second configuration.

As shown in FIGS. of 7*a* and 7B, the system is collapsible to fit into a shipping container such as a PELICAN™ case. In this regard, the base member 200 has a plurality of rotatable joints which allows the system to fold into a configuration that allows storage. The seat is configured to fall into a first position away from the base. While the base is configured to collapse along two axes to allow before portion of the base to be located adjacent to the seat.

Figure 8:
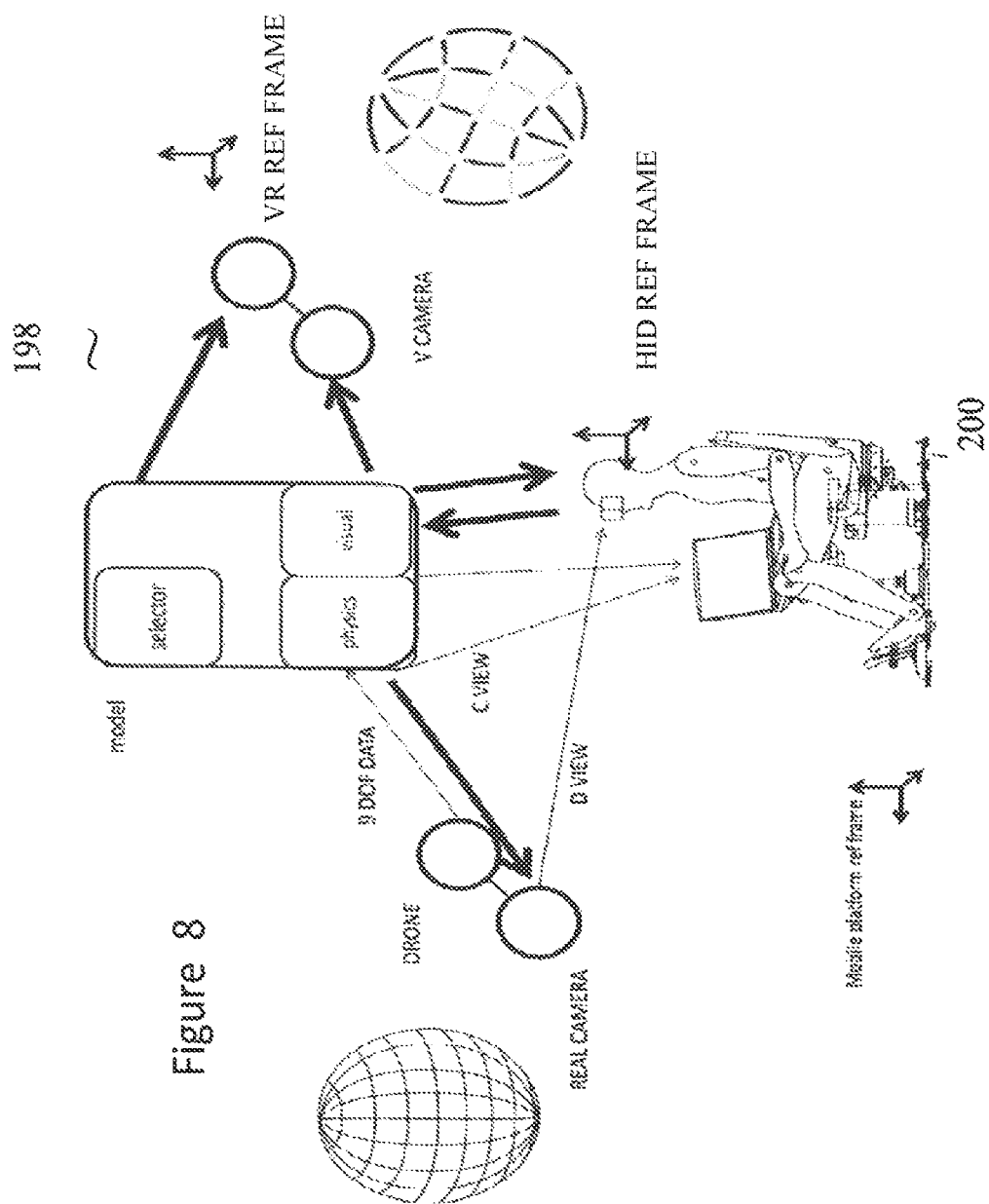
FIGS. 8 and 9 represents the system.
Figure 9:
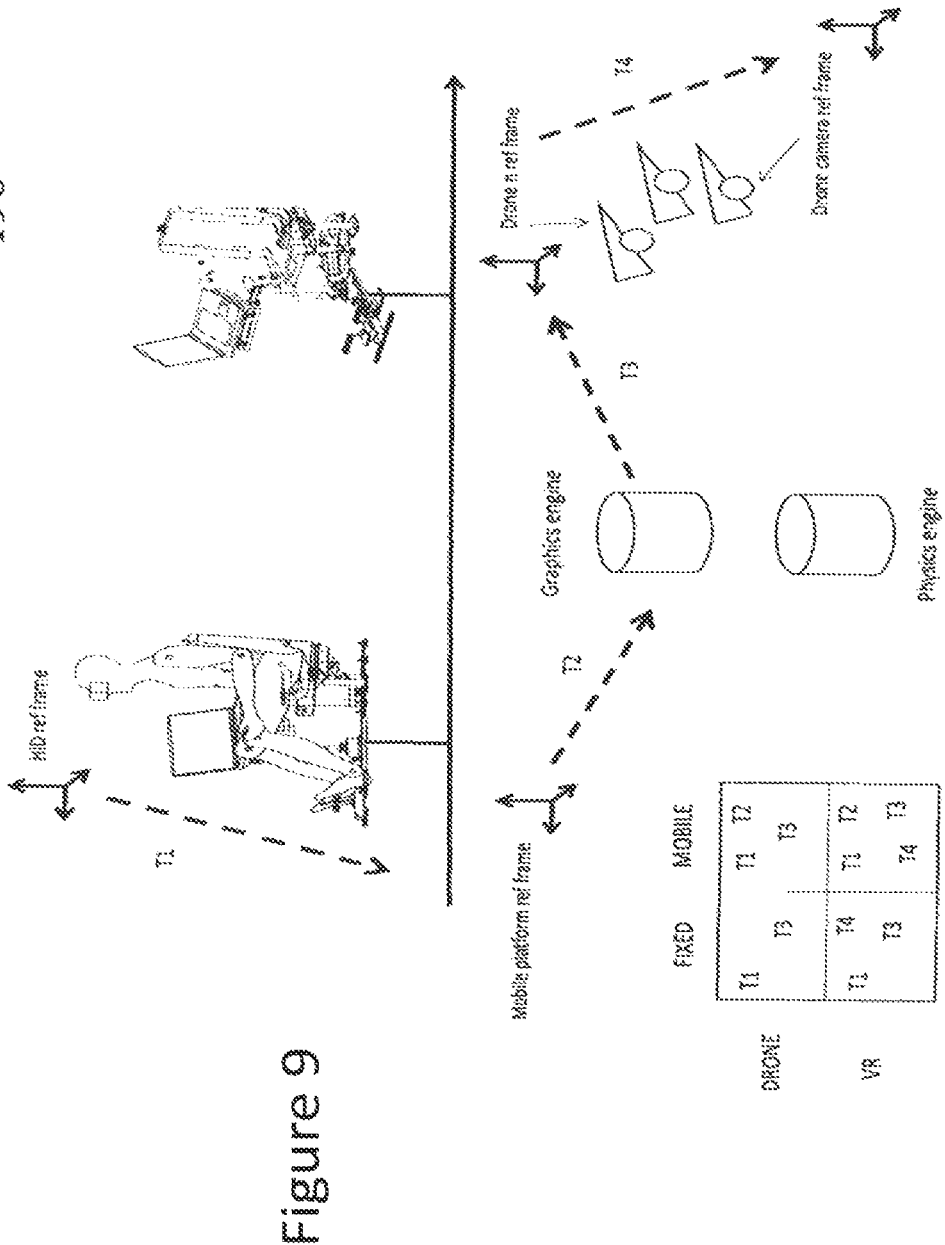

FIGS. 8 and 9 depict the system for training a user shown in schematic detail. The user is shown on the training device having a plurality of human interface devices. Additionally, the user has a virtual reality headset acts as a display and an input device which allows the user to control a vehicle within virtual reality space. Inputs from the human interface devices are sent to the system model, in this case a physics engine to provide an input into the virtual reality device. Visualizations are then generated by the model and provided to the virtual reality headset. Movement of the headset provides an input into the model which changes the view seen by the user. Optionally, they view can be set either to view of, for instance, an overhead view the vehicle being controlled, or a view through a virtual gimbals camera in virtual reality space.

Alternatively, the system can be used to steer a real autonomous vehicle such as a drone. In this regard, the human interface device will be used to communicate with the model which is coupled to a set of transceivers which communicate with the unmanned vehicle. The model sends at least 9 degrees of freedom of data to the drone to allow control of the drone's control surfaces. In one instance, the user can selectively engage the visual system which will allow the user to see the drone in virtual reality space which is mimicking the real world. In another instance, the user can selectively engage camera elements on the drone such as a gimbaled camera. While the drone is being flown using sticks and pedals, a camera gimbals' movement is controlled by movement of the user's head. Views from the camera can be streamed directly into the users head mounted display as opposed to through the engine.

Because each of these training simulators can be supported on mobile platforms, there is a problem with respect to movement of the human interface devices with respect to ground. This is because the moving platform will induce accelerations into the accelerometers when the mobile platform changes velocity or direction. In this regard, for example should the trainer system be coupled to the floor of a C-130 aircraft, movement of the aircraft would add additional Errors to the accelerometer inputs from the human interface devices as well as the VR head mounted display. To accommodate this error, as described below the reference frame for the human interface device and the virtual reality goggles must be adjusted, either using an Euler or quaternion transformation. A set of sensors positioned on the base is used to provide a signal which is either subtracted or added to the acceleration signals given in the human interface device or virtual reality goggles to correct errors caused by movement of the mobile platform (e.g. C-130) in the Earth's reference frame. These corrections allow for the proper use of the training system as well as an autonomous vehicle in a mobile platform.

If the training devices being used to steer a real drone, the reference frame of the drone must also be considered, thus leading to multiple transformations of data to and from the autonomous vehicle. And this can regard, the graphics engine will additionally adjust the view as seen by the user in the VR goggle system. In situations where the user is also controlling the camera system of a gamble on the drone, the reference frame between the drone and the camera must also be accounted for, leading to an additional transformation. As shown in FIG. 9, a truth table is depicted which shows the transformations which need to be accomplished for a given situation. For example, should be the trainer be used on a fixed platform in virtual reality mode, transformations T1 and T3 need to be accomplished should the camera be controlled by movement of the virtual reality headset, transformations T1, T3 and T4 are needed. When on a mobile platform, to allow for the proper steering of the drone using the human interface devices, transformations T1, T2 and T3 are needed. Similarly, when the gimbaled camera is being controlled by the headset on mobile platform transformations T1, T2, T3 and T4 are needed.

Figure 10:
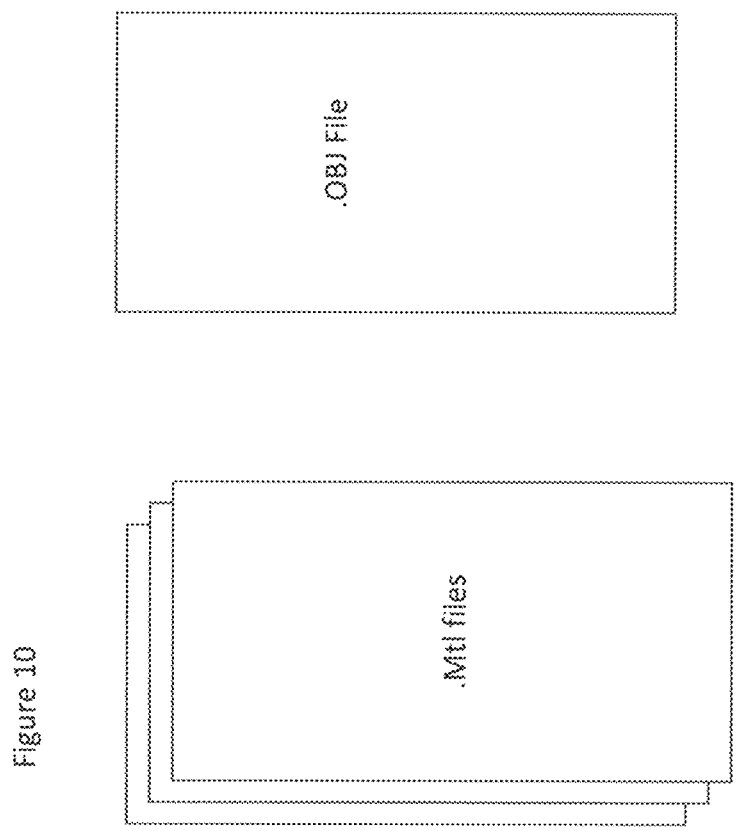
FIG. 10 represents a data structure for transferring VR maps.

The data structure for transmitting the maps according the the present teachings is shown in FIG. 10. In this regard, the maps are created and are generally stored as linked files such as .obj and .MTL files. When handling a large landscape, is is advantageous to use a single .obj file, which stores image location data and surfaces in the form of triangles. To add texture to these .obj files for imaging, a plurality of .mtl files is used to increase the resolution of the single .obj topography. When transferring the files, the .obj's can have layers of resolution. In this regard, a first layer can be an orthomosaic single layer photo which can be "viewed" from overhead. Associated with this image can be height information which corresponds to a the altitude of each pixel. A second level of detail can arrive in a separate layer which can be a second .obj file, or can be incorporated into the first .obj. This will have a map of features listed in a first low resolution level of detail. A third level of detail can arrive in a separate layer which can be a third .obj file, or can be incorporated into the first .obj. This will have a map of features listed in a second medium resolution level of detail. Subsequent layers can have increasing layers of detail. In low bandpass areas, the system will utilize only those complete maps which have been downloaded. As .obj and .mtl of greater resolution are downloaded, the physics and display engine will use the high level graphics content.

The control system includes a multi-axis accelerometer sets for each human input device as well as the head mounted VR goggles and the base. These accelerometer sets can include a three-axis accelerometer system and a multi-axis gyroscope system, such as a three-axis gyroscope system. The outputs of these respective systems are fed to microprocessor or microcontroller that has been programmed as described more fully herein to perform the control function. Microprocessor may be implemented, for example, using a digital signal processor (DSP) device shown by way of example only in FIG. 2.

One of the challenges of constructing a control system for control of a vehicle, is that the control decisions must typically be made quickly after deploying the device. Given the high speeds with which many modern-day devices travel, a significant distance can be traversed in a short amount of time. Thus, a control system may need to make many hundreds of calculations per second to accurately determine whether proper control has been achieved.

In most applications where the device is deployed within the gravitational field of a large mass, such as the Earth, forces of gravity do affect the readings obtained by the three-axis accelerometer on the sensor sets and thus the microprocessor is programmed to compensate for this. There are several ways that the initial gravity measurement can be achieved. In one embodiment, data from the three-axis accelerometer system are averaged over a predetermined time interval, such as five second, to arrive at an indication of gravity prior to device deployment or an engagement control. In an alternate embodiment, an external system can obtain a gravity measurement and supply it to the microprocessor. As will be discussed below, the gravity measurement is updated as the safe feedback calculations are being performed. Thus, at each incremental step in the calculations, the effects of gravity are accounted for. When used on a mobile platform, movement of the platform as well as gravity needs to be accounted for.

Microprocessor is supplied an engagement control signal via the serial port, whereupon it begins tracking motion using data from the three-axis accelerometer and from the three-axis gyroscope. Time zero, position zero and reference frame establishment is completed. Subsequent movements are assessed with respect to these initial starting time, position and reference frame, to determine if and/or when the device has achieved connection for feedback. Traversed distances in each of the three axes are incrementally measured starting from the (0,0,0) position where the three-axis accelerometer was located at the instant of an engagement control. The three-axis gyroscope orientation now of an engagement control defines the axes of the local reference frame onboard the device at the time of an engagement control.

Next, data are read or sampled from the three-axis accelerometer and three axis gyroscope sensors and certain corrections are applied to the raw data values. For example, in many instances the sensor technology used in the three-axis accelerometer and three axis gyroscopes can sometimes produce non-zero outputs even when they are not undergoing acceleration or rotation. These non-zero outputs are merely an undesired offset attributable to the internal electronic circuitry. To compensate for this, a zero-measured output (ZMO) correction factor is applied to cancel out the undesired offset.

Next, the microprocessor enters a nested iterative loop. Essentially, the loop computes the incremental distance traveled between the current entry and the previous entry. The microprocessor has values stored within its memory that correspond to the incremental distances traversed, considering any rotations that may have occurred in any of the three gyroscope axes during that increment. These values are transmitted back to the system to allow proper adjustment of the visuals in the head display. The processor compensates for drift of the accelerometer by utilizing data from the three-axis gyroscope, and magnetometers.

The microprocessor uses the incremental distance traveled, taking all three position dimensions and all three rotation orientations into account, to compute a traveled distance. The traveled distance is generally defined as the distance from the origin (at an engagement control) to the current position of the device. Displacement values in periodic increments, the travel distance is calculated by summing the squares of the individual x, y and z components of these incremental displacements. In this regard, the true incremental distance would be calculated by taking the square root of the sum of the squares. However, to reduce the computational burden on the microprocessor, the square root step is dispensed with. It is possible to do so because the Travelled Distance squared can be readily compared with the safe distance squared to arrive at a safe feedback decision. Having calculated the current travelled distance, the microprocessor then updates distance to make these values available to the feedback algorithm.

The acceleration data from the three-axis accelerometer (after having been corrected) are used to define global orientation vectors corresponding to each of the pitch, yaw and roll orientations of the virtual or real vehicle. Essentially, the current orientation for each of the accelerometer sensors within the three-axis accelerometer system is accounted for by using data from the three-axis gyroscope. Because the measurement system for computing travelled angle operates on incremental angles, there is a possibility for unwanted cumulative error to creep into the solution. Small incremental changes in position can add up over time to give the impression that a large distance has been traversed when, in fact, the distance perceived is merely an artifact of adding up many infinitesimal values that should have been disregarded.

The acceleration values obtained for the human interface devices, the goggles, or the vehicle can be time integrated by multiplying by a time step interval to arrive at a velocity value. As previously discussed, accelerometers, such as those used in the three-axis accelerometer system produce an output in the presence of gravitational forces or forces caused by movement of the mobile platform with respect to ground. The effect of such forces is not ignored, as they may introduce errors into the solution, particularly considering that the body to which the sensors are mounted may be rotating about any or all the yaw, pitch or roll axes. Thus, the microprocessor compensates by "subtracting out" the effect of gravity and movement of the mobile platform upon each of the acceleration axes, as dictated by the current reference frame orientation.

With the velocity thus calculated, the microprocessor next performs another time integration to calculate displacement. Time integration is performed by multiplying the velocity by the time step interval. Thus, the microprocessor has calculated a current position based on acceleration data acquired and compensated for yaw, pitch and roll orientation. Of course, the yaw, pitch and roll orientations cannot be assumed constant. Thus, the system calculates and updates the global orientation vector for use during the subsequent iteration.

The orientation vector updating procedure begins by linearly interpolating angular rate from the last measured value to a present value. Then the angular rates are time integrated to compute an angular displacement value. Computation of angular displacements can be performed using standard Euclidean geometry, Euler angles, and using a mathematical system based on the set of all integer values. Rotations in such conventionally represented three-dimensional space involve a set of computationally expensive calculations that pose practical limits on the speed at which a given microprocessor can compute rotational solutions. In addition, performing rotations in such three-space can give rise to the so-called Gimbal Lock problem, whereby under certain rotations one or more of the rotational axes can be lost if they become aligned in the same plane.

The system can optionally shift the orientation calculations from conventional three-space mathematics to a four-space mathematics utilizing quaternion calculations. Unlike the conventional three-space calculations based on real numbers or integer numbers, quaternion calculations are based on a four-space numbering system that encodes three orthonormal imaginary components, sometimes represented as a three-element vector and a fourth component, sometimes represented as a scalar component. Thus, if we define the following three orthonormal imaginary numbers:
i=(1, 0, 0)
j=(0, 1, 0)
k=(0, 0, 1)
The quaternion can thus be written:

$$q = q_0 + \overline{q} = q_0 + iq_1 + jq_2 + kq_3$$

In the above representation, the scalar component is q0 and the vector component corresponds to the $iq_1+jq_2+kq_3$ component. In a presently preferred embodiment, unit vectors, quaternion elements and other intermediate values that are guaranteed to be within [−2, +2] are stored as fixed-point numbers.

It is helpful to see that the quaternion can thus be used to encode both rotational information (in the scalar component) and positional information (in the vector component). Quaternion mathematics follows some but not all the operations available in conventional algebra. Notably, quaternion multiplication is not commutative, thus a×b does not equal b×a.

To utilize a quaternion representation and thereby more efficiently calculate rotations, the processor creates a quaternion representation of measured angular displacements. Generally, the quaternion representation is calculated by applying predetermined trigonometric relationships to the rotation magnitude and combining those results with a normalized rotation vector to generate the scalar and vector components of the quaternion representation. The current rotation quaternion is multiplied with the freshly calculated quaternion value (using a quaternion multiplication operation) to generate an updated current orientation quaternion. Thereafter, the stored current orientation quaternion is used to compute the respective pitch, yaw and roll vectors used to calculate the travelled distance and used to update the gravity vector or translated for movement of the base reference frame.

Each of the three pitches, yaw and roll calculations correspond to scalar values can be expressed as integers. Beyond this point, however, the system is working with vector quantities (and later quaternion quantities). The transition to vector representation takes place where the scalar values are multiplied by the respective pitch vector, yaw vector and roll vector that are each stored in memory. These respective pitch vector, yaw vector and roll vector values are updated using the current orientation quaternion later in the process.

The processor performs vector addition to combine the respective pitch, yaw and roll values to form a vector representation of these three orientations. The resulting vector corresponds to a total rotation rate vector, in other words, a vector indicating the rate of change in pitch, yaw and roll with respect to time.

$$qrotation = \begin{bmatrix} \cos\left(\frac{magnitude_A}{2}\right) \\ \sin\left(\frac{magnitude_A}{2}\right) * x_B \\ \sin\left(\frac{magnitude_A}{2}\right) * y_B \\ \sin\left(\frac{magnitude_A}{2}\right) * z_B \end{bmatrix}$$

To represent the total rotation vector as a quaternion value, the total rotation vector is split into two components: a total rotation value magnitude A and a normalized vector component B. The rotation magnitude component A is a scalar value, whereas the normalized rotation vector is a vector value. The total rotation magnitude is then applied using sine and cosine trigonometric calculations and these are then combined at with the normalized rotation vector to generate a quaternion representation of the total rotation vector. A presently preferred embodiment performs the sine and cosine calculations using lookup tables to gain speed.

The total rotation quaternion corresponds to the incremental value obtained using the current readings from the pitch, yaw and roll gyroscopes. This value is then combined with a previously obtained value stored in memory designated at the current orientation quaternion. In this regard, the current orientation quaternion corresponds to the value previously calculated and in process of being updated using the value calculated. More specifically, the total rotation quaternion is combined with the current orientation quaternion using a quaternion multiplication operation. The result of this multiplication is stored at step back into the current orientation quaternion memory location. Thus, the current orientation quaternion is being updated based on information just obtained from the three-axis gyroscope system.

The current orientation quaternion, having been updated, is now used to update the pitch vector, yaw vector and roll vector. The updating is performed by performing a vector-quaternion rotation operation (one operation for each of the three pitches, yaw and roll vectors). Focusing for the moment on vector-quaternion rotation operation, the operation is performed by taking the current orientation quaternion and applying to it the unit vector [1.0, 0.0, 0.0] which, in effect, extracts a newly calculated pitch vector which is then stored by process into the memory location. Similar operations are performed for the yaw and roll vectors. Note that the unit vectors differ from one another and from the unit vector to allow the desired component to be selected.

Thus, the orientation information extracted from the three-axis gyroscope system is used to update the respective pitch, yaw and roll vectors, which are in turn used in the next succeeding update operation. In addition to updating the pitch, yaw and roll vectors, the current orientation quaternion is also used to update the gravity vector. This is accomplished by performing a vector-quaternion inverse rotation operation upon the initial gravity vector. The results of this inverse rotation operation are then stored. It will be recalled that the initial gravity vector was initially obtained prior to an engagement control. The gravity vector or base movement vector is mathematically rotated along with the local axis vectors (except in the opposite direction) as the device is physically rotated, such that the gravity vector always points in the same direction (down) in the global coordinate system. When calculating acceleration, the measured acceleration is mapped into the global coordinate system, and then the gravity vector is added to it to get the effective acceleration, or acceleration that results in motion.

The manner of processing the accelerometer data will now be described. The accelerometer data are first read from the respective x, y and z accelerometers. ZMO correction values are then applied by scalar addition. To these values the scale factor stored in memory are applied by scalar multiplication at steps. To these values the pitch, yaw and roll vectors are applied by scalar vector operations, respectively.

The result of these scalar vector operations is a set of vectors for each of the x, y and z accelerations. These are combined by vector addition to generate a single vector value representing each of the x, y and z acceleration components. It will be recalled that the gravity vector is updated by the vector-quaternion inverse rotation operation. Vector addition of the gravity of base vector effectively removes the component of the acceleration vector attributable to the force of gravity or the mobile platform.

It will be seen that the quaternions track the rotation, so that once the processor computes the current orientation quaternion, that current value is used to transform the local axis vectors (yaw, pitch, roll) into the global coordinate system. The global axis vectors are used to determine the direction that the accelerometers are pointing, so that when they are sampled, the resulting accelerations can be added in the correct direction. The travelled distance is calculated by performing a double integral on the 3D accelerations once they have been transformed into the global coordinate system.

In embodiments, devices, systems and methods for improving elevation and or jump control include measuring the internal pressure of an enclosed seat volume and translating pressure changes to input signals suitable for the control of computer instructions, such as, for example a computer running a virtual reality or similar simulation. The pressure of an enclosed volume of seating structure is measured and corresponds to an axis of control. In use, the occupant I player applies or removes weight to/from the seat by supporting of his or her mass, such as for example by having the user lift his or her body mass off the seat or rest his or her body mass more firmly onto the seat. A reservoir, load cell or other suitable structure in the seat detects a reduced or increased pressure to indicate an input along a gradient or specific point. This change in pressure is converted to a computer readable signal and is used as an input function to provide instructions to a computing device.

When used as a seat, this support member can be used as a zero-balance seat for elevation control is shown and described where the height of posterior shelf I seat is measured, corresponding to an axis of control suitable for use as an input instruction on a computing device. Where there is a dead zone to accommodate for regular movement (like breathing or fidgeting), and then the ability for the user to support themselves to thereby change the height of the seat.

In some embodiments additional input mechanisms are provided so that users can use additional motions and I or body parts to provide input. For example, users may use their arms, hands and or forearms on arm rests or other suitable structures to provide additional axis of controls or inputs. Users may also use their lower back, core angle open and closed (lean forward I lean backward while bending at the waist) and I or the use of seat back to control input. In some embodiments users may also use their lower extremities to provide input. Such as, for example, the use of foot movements and I or gestures as an additional input or input modifier. By way of example, IMU tracked controllers attached to the feet of users, touch pad enabled floor mats, or the like may be used to capture foot movement and/or gestures. In some embodiments users may provide input with the upper portion of their legs such as for example by using their inner thighs to engage structures on the seat such as a paddle, switch, axis input or the like.

As shown on FIG. 1, a chest mounted device can be used to Measures the angle of the chest with respect to ground and provide an input signal (for example) to indicate W, A, S, D in a VR gaming type system to cause forward, left, right or reverse movement. The encoder in the can measure the rotation of a body in a chair from nominal for the afore described systems.

In some embodiments, the system mounts switches on a cantilever so that the switches can travel to extents and then the cantilever will flex before and after switch actuation to ensure that the switch engagement is consistent and the force from a rigidly mounted switch could be destructive. There is also a travel limitation block that can be exchanged or lowered. In some embodiments, above each switch range is a ramp that can be slid to a lower or higher profile to increase or decrease sensitivity of the switch.

Addressing the ability to suggest or even force movement of the rotation of the device: In some embodiments, the use of springs, or belts belt and I or gear combined with a motor provides feedback into the seat to provide guidance or resistance to user input. This allows for force feedback (like popular racing simulator steering wheels) which in VR, could be implemented as director's nudges/encouragement to ensure that the participant is not missing key cinematic or other important events. The use of an encoder to track angular position is provided. The encoder can be part of the motor, in some embodiments, and is driven through gears or belt mechanisms. At Each joint, an encoder and a motor can be used for allowing for intelligent force feedback, user orientation prompting and/or enforcement. In some embodiments the motor is direct drive while in other embodiments a transmission is employed.

In some embodiments, the pivot point is positioned high on the seat to facilitate ease of use, comfort and control. For example, Drones today are predominately four rotary wings (propellers) situated in a rectangle or square which can vary their power to maintain orientation or move in any given direction or speed. Using an HMD to control the "eyes" of the device, the angle of the torso/chair to define forward, and each switch to provide the planar movement of the aircraft, and then in some embodiments, a hand or foot manipulated input device, as previously described herein to control additional controls integrated in the drone. Control schemes in some embodiments may include controlling the elevation of the drone based on pressure of a controlled volume or elevation change of the chair itself by the user supporting their weight to upset or overcome the balance of a neutral weight balance system. Moving control to other parts of the body, rather than the hands, can allow for additional axis of control to be manipulated by the very accurate and tactile fingers, for example, systems such as fire control or robotic hands or manipulators. Control for using hybrid rotary wing/lift surface drone control (osprey-class device) is also contemplated.

Control seats as described herein are also useful in an augmented reality environment. By providing a target surface for the occupant and display, and combining the rotary encoder, the occupant can be presented with an augmented world that is updating properly in accordance with the user's position. In such embodiments a rotary encoder detects the radial position I orientation of the user and communicates that information to the computing device rendering the augmented reality such that the computing device can adjust the position of the augmented reality content so that it matches the user's position in the real world.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various implementations of the systems and methods described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, scripts, or program code) include machine instructions, for a programmable processor, and can be implemented in a high-level procedural and/or object-oriented programming language, and/or in assembly/machine language. The computer programs can be structured functionality in units referenced as "modules". As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in an order, this should not be understood as requiring that such operations be performed in the order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and the described program components and systems can generally be integrated together in a single software product or packaged into multiple software products.

Several implementations have been described. Nevertheless, it will be understood that various modifications may be made without departing from the spirit and scope of the disclosure. Accordingly, other implementations are within the scope of the following claim . For example, the actions recited in the claim can be performed in a different order and still achieve desirable results.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Upon reading this disclosure, those of skill in the art will appreciate still additional alternative structural and functional designs for a system and a process for deep search in computing environments through the disclosed principles herein. Thus, while embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claim .

The invention claimed is:

1. A method of controlling a vehicle comprising the steps of:
    capturing a series of 2d images for a topographic landscape of a real world location using a camera and converting the series of images for the topographic landscape into a captured set of images and onto a wire frame of the topographic landscape using photogrammetry;
    syncing the wire frame of the topographic landscape to a real world location using a fixed coordinate system;
    apply physical rules to a first set of objects within the virtual reality dataset with a physics engine, a display engine is coupled to the physics engine to convert the dataset and the captured set of images and the wire frame of the topographic landscape into first and second content streams;
    streaming a VR first content set from the three-dimensional graphics data at a first level of detail to a first VR headset and a second content set three-dimensional graphics data at a second level of detail to VR headset, wherein the first VR image dataset includes a selectably engageable virtual sandbox which gives an overhead view of the entire topographic landscape, and a VR data space topography;
    selectively engage the first VR headset which allows the user to see virtual representations of a vehicle in virtual reality space, the vehicle being located in the real world location; and
    coupling the physics engine model to a set of transceivers that communicate with the vehicle being located in the real world location, wherein the physics engine sends at least 9 degrees of freedom of data to the vehicle located in the real world location to control the vehicle's control surfaces.

2. The method according to claim 1 wherein streaming a first content set includes streaming training scenarios and wherein the first content set further comprises a rendered topographic landscape as an .obj file having a plurality of .mtl files.

3. The method according to claim 1 further comprising a third content set that has an augmented reality content that is less than the content of the first content set.

4. The method according to claim 1 further including selectively engaging a gimbaled camera on the vehicle, wherein images from the gimbaled camera are streamed into the users head mounted display.

5. The method according to claim 1, including providing a second AR image dataset having less content than the first VR image dataset which is streamed to an AR display.

6. The method according to claim 1, wherein the overhead view of the entire topographic landscape, includes the first set of objects.

7. A method of sharing a three-dimensional virtual reality space among a plurality of users, the method comprising the steps of:
    acquiring a plurality of 2-D images of a geographic region using a mobile platform;
    using photogrammetry to create a first set of three-dimensional graphics data associated with a geographic region to be used by the plurality of users in a shared manner, the first set of three-dimensional graphics data containing a first .obj file and an associated plurality of .mtl files;
    functionally coupling the first set of three-dimensional graphics data to a physics engine configured to apply physical rules to objects within a virtual reality dataset;
    coupling an object set to the virtual reality dataset;
    coupling a display engine to the physics engine to convert the virtual reality dataset into first and second content streams, said first content stream selectively includes a first engageable virtual sandbox visual content which gives an overhead view of the entire topography, and in VR data space topography visual content;
    selectively engaging a VR headset which allows the user to see virtual representations of the a first set of three-dimensional graphics data and objects in virtual reality space, wherein one of the objects is an item having control surfaces being located in the real world location;
    coupling the physics engine to a set of transceivers that communicate with the item being located in the real world location, wherein the physics engine sends at least 9 degrees of freedom of data to the item located in the real world location to control the items control surfaces; and
    positioning a VR headset having a first head reference frame having changes in one of first velocity and first acceleration induced by a user's movement within a second moving reference frame having changes in one of a second velocity and a second acceleration, selectively streaming either one of the first content streams and second content streams from the three-dimensional graphics data to the VR headset selectively based upon differences between changes in one of first velocity and first acceleration induced by a user's movement, and changes in one of the second velocity and the second acceleration.

8. The method according to claim 7 wherein streaming a first content stream includes streaming the first dataset which comprises a rendered topographic landscape of the geographic region.

9. The method according to claim 7 wherein streaming a second content stream includes streaming the second dataset having content that is less than the content of the first dataset.

10. The method according to claim 7 including capturing a series of images for a terrain using a camera mounted on an unmanned aircraft and converting the series of images for a terrain into a captured set of images and into a wire frame of the topographic landscape.

11. The method according to claim 10 including syncing the topographic landscape to a real world located using a fixed coordinate system.

12. The method according to claim 10 including providing a set of polygons over the wire frame to form a virtual reality image dataset.

13. The method according to claim 7 including converting the coupling the first set of three-dimensional graphics data into a second VR image dataset having less content than the first content stream which is streamed to an VR display.

14. A method for controlling a vehicle comprising the steps of: capturing a series of images of a terrain using a ccd camera and a LIDAR providing pixel location information disposed on a mobile platform traveling over the terrain, wherein capturing a series of images of a terrain using a ccd camera disposed on a mobile platform traveling over the terrain includes defining a flight path using computer numeric control cutter-path system to define the path of a data collection drone to most efficiently calculate needed information for a variety of layers in a variety of spectrum;
   converting the series of images for the terrain into a captured subset of images and into a wire frame of the topographic landscape to form a VR image dataset;
   syncing the wire frame of the topographic landscape to a real world location using a fixed coordinate system by associating the ccd camera and a LIDAR providing pixel location information;
   applying a signal from a physics engine to an object within the VR image dataset;
   streaming a first image dataset stream from the VR image dataset to a VR display; selectively engage a VR headset which allows the user to see virtual representations of a vehicle in virtual reality space, the vehicle being located in the real world location; and
   coupling the physics engine to a set of transceivers that communicate with the vehicle being located in the real world location, wherein the physics engine sends at least 9 degrees of freedom of data to the vehicle located in the real world location to control the vehicle's control surfaces.

15. The method according to claim 14 further includes providing a virtual tool that allows the placement of virtual objects within the VR image dataset.

16. The method according to claim 14 further includes providing a virtual tool that allows visualization of the movement of people on the terrain and modifying the VR image set to include information related to the movement of people on the terrain.

\* \* \* \* \*